US012008959B2

(12) United States Patent
Lee et al.

(10) Patent No.: US 12,008,959 B2
(45) Date of Patent: Jun. 11, 2024

(54) PIXEL CIRCUIT AND DISPLAY DEVICE INCLUDING THE SAME

(71) Applicant: LG Display Co., Ltd., Seoul (KR)

(72) Inventors: Yong Won Lee, Paju-si (KR); Hyun Soo Lee, Paju-si (KR); Ki Young Kwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/840,085

(22) Filed: Jun. 14, 2022

(65) Prior Publication Data

US 2023/0008017 A1 Jan. 12, 2023

(30) Foreign Application Priority Data

Jul. 8, 2021 (KR) ........................ 10-2021-0089932
Dec. 3, 2021 (KR) ........................ 10-2021-0171446

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2310/0272* (2013.01)

(58) Field of Classification Search
CPC .. G09G 3/3233; G09G 3/3266; G09G 3/3291; G09G 3/3258; G09G 3/32; G09G 3/3208; G09G 3/20; G09G 2300/0819; G09G 2300/0842; G09G 2300/0861; G09G 2300/0426; G09G 2300/043; G09G 2320/043; G09G 2320/0233; G09G 2320/0295; G09G 2320/045; G09G 2310/0262; G09G 2310/08; G09G 2310/0251
See application file for complete search history.

(56) References Cited

U.S. PATENT DOCUMENTS 10,879,319 B2 12/2020 Bang et al.
2007/0109232 A1* 5/2007 Yamamoto ........... G09G 3/3233 345/77

(Continued)

FOREIGN PATENT DOCUMENTS

KR 10-2017-0081082 A 7/2017
KR 10-2020-0032291 A 3/2020

OTHER PUBLICATIONS

Korean Intellectual Property Office, Office Action, Korean Patent Application No. 10-2021-0171446, dated Jan. 28, 2024, 10 pages.

*Primary Examiner* — Dong Hui Liang
(74) *Attorney, Agent, or Firm* — Fenwick & West LLP

(57) ABSTRACT

A pixel circuit and a display device including the same are disclosed. The pixel circuit includes a driving element including a first electrode connected to a first node to which a pixel driving voltage is applied, a gate electrode connected to a second node, and a second electrode connected to a third node, and configured to supply an electric current to a light emitting element; a first switch element discharging the second node; and a second switch element configured to supply a data voltage to the second node. The light emitting element and the first switch element are commonly connected to a VSS node to which a low-potential power supply voltage is applied.

10 Claims, 17 Drawing Sheets

(56) References Cited

U.S. PATENT DOCUMENTS

| | | | | |
|---|---|---|---|---|
| 2014/0055325 | A1* | 2/2014 | Qi | G09G 3/3233 315/227 R |
| 2016/0098961 | A1* | 4/2016 | Han | G09G 3/3291 345/83 |
| 2019/0073952 | A1* | 3/2019 | Kuang | G09G 3/3233 |
| 2020/0091252 | A1 | 3/2020 | Bang et al. | |
| 2021/0118963 | A1 | 4/2021 | Bang et al. | |
| 2021/0233458 | A1* | 7/2021 | Yang | G09G 3/3225 |

* cited by examiner

PIXEL CIRCUIT AND DISPLAY DEVICE INCLUDING THE SAME

CROSS-REFERENCE TO RELATED APPLICATIONS

This application claims priority to Republic of Korea Patent Application No. 10-2021-0089932, filed Jul. 8, 2021, and Republic of Korea Patent Application No. 10-2021-0171446, filed Dec. 3, 2021, each of which is hereby incorporated by reference in its entirety.

BACKGROUND

1. Field

This disclosure relates to a pixel circuit and a display device including the same.

2. Discussion of Related Art

An electroluminescence display device may be divided into an inorganic light emitting display device and an organic light emitting display device according to the material of the emission layer. The active matrix type organic light emitting display device includes an organic light emitting diode (hereinafter, referred to as "OLED") that emits light by itself, and has the advantage of fast response speed, high light-emitting efficiency, high luminance and wide viewing angle. In the organic light emitting display device, the OLED (organic light emitting diode) is formed in each pixel. The organic light emitting display device has a fast response speed, excellent light-emitting efficiency, luminance, and viewing angle, and has also excellent contrast ratio and color reproducibility because black gray scale can be expressed as complete black.

A pixel circuit of an organic light emitting display device includes a light emitting element, a driving element for driving the light emitting element, and one or more switch elements. The switch elements are turned on/off according to the gate voltage to connect or block main nodes of the pixel circuit. The driving element and the switch elements may be implemented as transistors.

A low-potential power supply voltage is commonly applied to the pixels of the organic light emitting display device. In the pixel circuit, when a switch element connected to the low-potential power supply voltage through the capacitor is turned on, a ripple may be generated in the low-potential power supply voltage. In this case, the current flowing through the light emitting element may be changed, which, in turn, may result in the change in the luminance of the pixels. Particularly, in a crosstalk pattern displayed on the screen when a sensing pulse and a scan pulse simultaneously generate a gate-on voltage between pixel lines spaced apart on the screen, a line dim or a block dim due to the ripple of the low-potential power supply voltage may become visible.

SUMMARY

The disclosure has been made in an effort to address aforementioned necessities and/or drawbacks.

This disclosure provides a pixel circuit capable of preventing or at least reducing image quality deterioration due to a ripple of a low-potential power supply voltage commonly applied between pixels, and a display device including the same.

The drawbacks which this disclosure addresses are not limited to the aforementioned ones, but other drawbacks which can be solved by this disclosure will become apparent to those skilled in the art from the description below.

A pixel circuit according to an embodiment of this disclosure includes a driving element which includes a first electrode connected to a first node to which the pixel driving voltage is applied, a gate electrode connected to a second node, and a second electrode connected to a third node, and configured to supply an electric current to a light emitting element EL; a first switch element discharging the second node; and a second switch element configured to supply a data voltage to the second node. The light emitting element and the first switch element are commonly connected to a VS S node to which a low-potential power supply voltage is applied.

A pixel circuit according to another embodiment of this disclosure includes a driving element including a first electrode connected to a first node, a gate electrode connected to a second node, and a second electrode connected to a third node, and configured to supply an electric current to a light emitting element; a first switch element discharging the second node; a second switch element configured to supply a data voltage to the second node; a third switch element configured to supply a reference voltage to the third node; a fourth switch element configured to supply an initialization voltage to the second node; and a fifth switch element configured to supply a pixel driving voltage to the first node, wherein the light emitting element and the first switch element are commonly connected to a VSS node to which a low-potential power supply voltage is applied.

The display device of this disclosure includes at least one of the aforementioned pixel circuits.

According to this disclosure, a switch element is added between the second node connected to the gate electrode of the driving element for driving the light emitting element and the VSS node to which the low-potential power supply voltage is applied, so that the second node can be discharged to turn off the light emitting element, thereby suppressing light from being emitted, and reducing residual charges of the display panel.

According to this disclosure, the ripple of the low-potential power supply voltage can be reduced by lowering the voltage of the second node and reducing the voltage fluctuation range of the third node before the voltage of the third node connected to the source electrode of the driving element changes abruptly.

According to this disclosure, all pixel lines of the display panel can be simultaneously discharged in a power OFF sequence in which the power of the display device is turned off using the aforementioned switch element, thereby reducing the current charges of the display panel.

Effects of this disclosure are not limited to the effects mentioned above, and other effects not mentioned above will be clearly appreciated by those skilled in the art from the appended claims.

BRIEF DESCRIPTION OF DRAWINGS

The above and other objects, features and advantages of the present invention will become more apparent to those skilled in the art by describing exemplary embodiments thereof in detail with reference to the accompanying drawings, in which.

DETAILED DESCRIPTION

Figure 1:
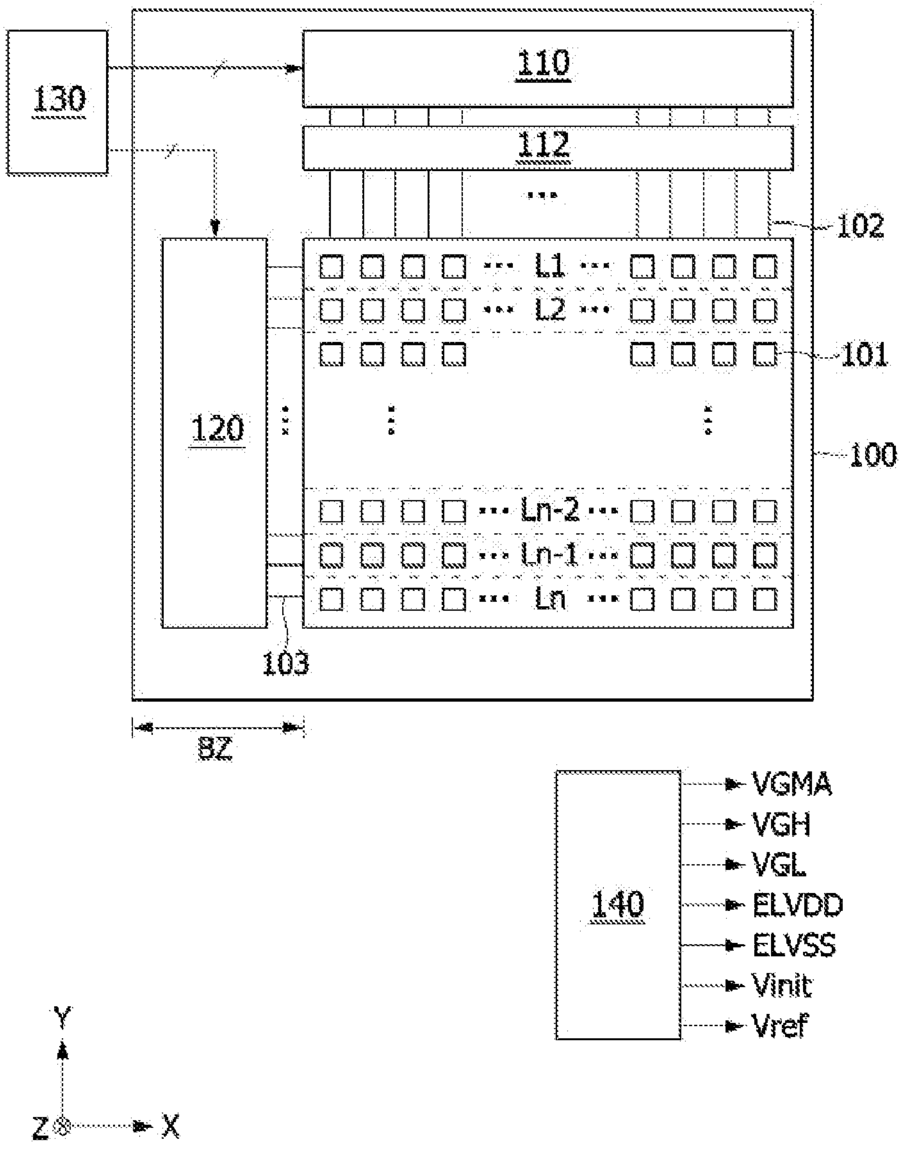
FIG. 1 is a block diagram showing a display device according to an embodiment of this disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," and "having," used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Each of the pixels may include a plurality of sub-pixels having different colors in order to reproduce the color of the image on a screen of the display panel. Each of the sub-pixels includes a transistor used as a switch element or a driving element. Such a transistor may be implemented as a TFT (thin film transistor).

A driving circuit of the display device writes a pixel data of an input image to pixels on the display panel. To this end, the driving circuit of the display device may include a data driving circuit configured to supply data signal to the data lines, a gate driving circuit configured to supply a gate signal to the gate lines, and the like.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like. In the embodiments described herein, description are given based on an example in which the transistors of the pixel circuit and the gate driving circuit are implemented as the n-channel oxide TFTs, but the present disclosure is not limited thereto.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage less than a drain voltage such that electrons may flow from a source to a drain. The n-channel transistor has a direction of a current flowing from the drain to the source. In the case of a p-channel transistor (p-channel metal-oxide semiconductor (PMOS), since carriers are holes, a source voltage is greater than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage greater than a threshold voltage of a transistor, and the gate-off voltage is set to a voltage less than the threshold voltage of the transistor.

The transistor is turned on in response to the gate-on voltage and is turned off in response to the gate-off voltage. In the case of an n-channel transistor, a gate-on voltage may be a gate high voltage, and a gate-off voltage may be a gate low voltage.

Hereinafter, various embodiments of this disclosure will be described with reference to the accompanying drawings. In the following embodiments, the display device will be described mainly with respect to the organic light emitting display device, but this disclosure is not limited thereto. Also, the scope of this disclosure is not intended to be limited by the names of components or signals in the following embodiments and claims.

Figure 2:
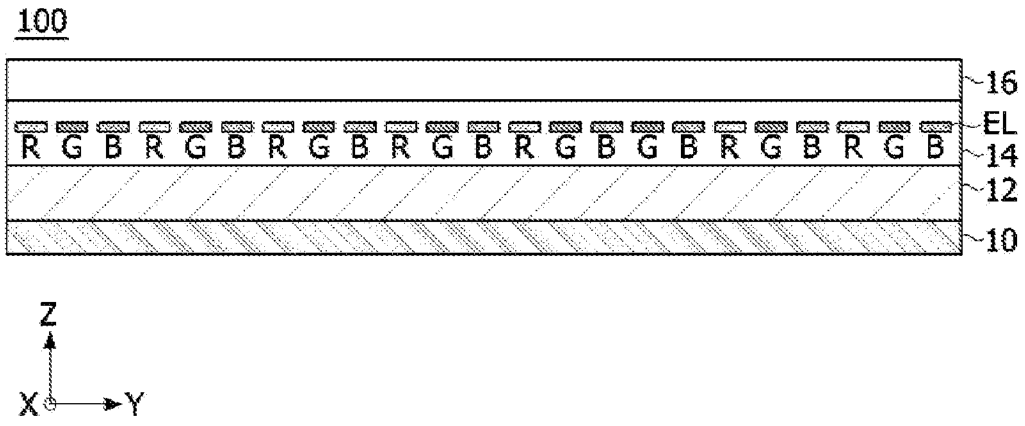
FIG. 2 is a cross-sectional view showing a cross-sectional structure of the display panel shown in FIG. 1 according to an embodiment of this disclosure.

Referring to FIGS. 1 and 2, a display device according to an embodiment of this disclosure includes a display panel 100, a display panel driver for writing pixel data to pixels of the display panel 100, and a power supply 140 for generating power required to drive the pixels and the display panel driver.

The display panel 100 may be a panel having a rectangular structure with a length in the X-axis direction, a width in the Y-axis direction, and a thickness in the Z-axis direction. The display panel 100 includes a pixel array that displays an input image on a screen. The pixel array includes a plurality of data lines 102, a plurality of gate lines 103 crossing the data lines 102, and pixels arranged in a matrix form. The display panel 100 may further include power lines commonly connected to the pixels. The power lines supply a substantially constant voltage required for driving the pixels 101 to the pixels 101. For example, the display panel 100 may include a VDD line to which a pixel driving voltage ELVDD is applied and a VSS line to which a low electric potential power supply voltage ELVSS is applied. In addition, the power lines may further include a REF line to which a reference voltage Vref is applied, an INIT line to which an initialization voltage Vinit and VINI is applied, and the like.

As shown in FIG. 2, the cross-sectional structure of the display panel 100 may include a circuit layer 12 stacked on a substrate 10, a light emitting element layer 14, and an encapsulation layer 16 according to an embodiment.

The circuit layer 12 may include a TFT array including a pixel circuit connected to wires such as a data line, a gate line, a power line, and the like, a de-multiplexer array 112, a gate driver 120 and the like. The wire and circuit elements of the circuit layer 12 may include a plurality of insulating layers, two or more metal layers separated with the insulating layer therebetween, and an active layer including a semiconductor material. All transistors formed in the circuit layer 12 may be implemented as n-channel oxide TFTs.

The light emitting element layer 14 may include a light emitting element EL driven by the pixel circuit. The light emitting element EL may include a red (red, R) light emitting element, a green (green, G) light emitting element, and a blue (blue, B) light emitting element. In another embodiment, the light emitting element layer 14 may include a white light emitting element and a color filter. The light emitting elements EL of the light emitting element layer 14 may be covered by a multi-layered protective layer including an organic film and an inorganic protective film.

The encapsulation layer 16 covers the light emitting element layer 14 to seal the circuit layer 12 and the light emitting element layer 14. The encapsulation layer 16 may also have a multi-insulating film structure in which an organic film and an inorganic film are alternately stacked. The inorganic film blocks or at least reduces permeation of moisture and oxygen. The organic film planarizes the surface of the inorganic film. When the organic layer and the inorganic layer are stacked in multiple layers, the movement path of moisture or oxygen becomes longer than that of a single layer, so that penetration of moisture and oxygen affecting the light emitting element layer 14 can be effectively blocked or at least reduced.

A touch sensor layer omitted from the drawing may be formed on the encapsulation layer 16, and a polarizer or a color filter layer may be disposed thereon. The touch sensor layer may include capacitive touch sensors that sense a touch input based on a change in capacitance before and after the touch input. The touch sensor layer may include insulating layers and metal wire patterns forming the capacitance of the touch sensors. The insulating layers may insulate the crossing portions of the metal wire patterns, and may planarize the surface of the touch sensor layer. The polarizer may improve visibility and contrast ratio by converting the polarization of external light reflected by the metal of the touch sensor layer and the circuit layer. The polarizer may be implemented as a polarizer or a circular polarizer to which a linear polarizer and a phase retardation film are bonded. A cover glass may be adhered to the polarizer. The color filter layer may include red, green, and blue color filters. The color filter layer may further include a black matrix pattern. The color filter layer absorbs a portion of the wavelength of light reflected from the circuit layer and the touch sensor layer, so that it can replace the polarizer and increase the color purity of the image reproduced in the pixel array.

The pixel array includes a plurality of pixel lines L1 to Ln. Each of the pixel lines L1 to Ln includes one line of pixels arranged along the line direction (X-axis direction) in the pixel array of the display panel 100. The pixels arranged in one pixel line share gate lines 103. Sub-pixels arranged in the column direction Y along the data line direction share the same data line 102. One horizontal period is a time obtained by dividing one frame period by the total number of pixel lines L1 to Ln.

The display panel 100 may be implemented as a non-transmissive display panel or a transmissive display panel. The transmissive display panel may be applied to a transparent display device in which an image is displayed on a screen and an actual background is visible. The display panel 100 may be manufactured as a flexible display panel.

Each of the pixels 101 may be divided into a red sub-pixel, a green sub-pixel, and a blue sub-pixel to implement color. Each of the pixels may further include a white sub-pixel. Each of the sub-pixels includes a pixel circuit. Hereinafter, a pixel may be interpreted as having the same meaning as a sub-pixel. Each of the pixel circuits is connected to data lines, gate lines, and power lines.

The pixels may be arranged as real color pixels and pentile pixels. The pentile pixel may implement a higher resolution than a real color pixel by driving two sub-pixels having different colors as one pixel 101 using a preset pixel rendering algorithm. The pixel rendering algorithm may compensate for insufficient color representation in each pixel with the color of light emitted from an adjacent pixel.

The power supply 140 generates a direct current (DC) voltage (or a constant voltage) required for driving the pixel array of the display panel 100 and the display panel driver by using a DC-DC converter. The DC-DC converter may include a charge pump, a regulator, a buck converter, a boost converter, and the like. The power supply 140 may generate DC voltage (or constant voltage) such as the gamma reference voltage VGMA, gate-on voltage VGH, gate-off voltage VGL, pixel driving voltage ELVDD, low electric potential power supply voltage ELVSS, initialization voltage Vinit and VINI, reference voltage Vref, or the like by adjusting the level of the DC input voltage applied from the host system (not shown). The gamma reference voltage VGMA is supplied to the data driver 110. The gate-on voltage VGH and the gate-off voltage VGL are supplied to the gate driver 120. The constant voltage such as pixel driving voltage ELVDD, low electric potential power supply voltage ELVSS, initialization voltage Vinit and VINI, reference voltage Vref, or the like is supplied to the pixels 101 through power lines commonly connected to the pixels 101. The constant voltages applied to the pixel circuit may have different voltage levels.

The display panel driver writes the pixel data of the input image to the pixels of the display panel 100 under the control of the timing controller 130.

The display panel driver includes the data driver 110 and the gate driver 120. The display panel driver may further include a de-multiplexer array 112 disposed between the data driver 110 and the data lines 102.

The de-multiplexer array 112 sequentially supplies the data voltages outputted from the channels of the data driver 110 to the data lines 102 using a plurality of de-multiplexers (DEMUX). The de-multiplexer may include a plurality of switch elements disposed on the display panel 100. When the de-multiplexer is disposed between the output terminals of the data driver 110 and the data lines 102, the number of channels of the data driver 110 may be reduced. The de-multiplexer array 112 may be omitted.

The display panel driver may further include a touch sensor driver for driving the touch sensors. The touch sensor driver is omitted from FIG. 1. The data driver 110 and the touch sensor driver may be integrated into one drive IC (integrated circuit). In a mobile device or a wearable device, the timing controller 130, the power supply 140, the data driver 110, and the like may be integrated into one drive IC.

The display panel driver may operate in a low speed driving mode under the control of the timing controller 130. The low speed driving mode may be set to reduce power consumption of the display device when the input image does not change by a preset number of frames by analyzing the input image. In the low speed driving mode, the power consumption of the display panel driver and the display panel 100 may be reduced by lowering a refresh rate of pixels when a still image is inputted for a predetermined time or longer. The low speed driving mode is not limited to when a still image is input. For example, when the display device operates in the standby mode or when a user command or an input image is not inputted to the display panel driver for a predetermined time or more, the display panel driver may operate in the low speed driving mode.

The data driver 110 receives pixel data of an input image received as a digital signal from the timing controller 130 and outputs a data voltage. The data driver 110 generates a data voltage Vdata by converting pixel data of an input image into a gamma compensation voltage every frame period using a digital to analog converter (DAC). The gamma reference voltage VGMA is divided into a gamma compensation voltage for each gray scale through a voltage divider circuit. The gamma compensation voltage for each gray level is provided to the DAC of the data driver 110. The data voltage Vdata is outputted from each of the channels of the data driver 110 through an output buffer.

The gate driver 120 may be implemented as a gate in panel (GIP) circuit formed in the circuit layer 12 on the display panel 100 together with the TFT array and wires of the pixel array. The gate driver 120 may be disposed on a bezel BZ, which is non-display region of the display panel 100, or may be distributed in a pixel array in which an input image is reproduced. The gate driver 120 sequentially outputs the gate signal to the gate lines 103 under the control of the timing controller 130. The gate driver 120 may sequentially supply the gate signals to the gate lines 103 while shifting the gate signals using a shift register. The gate signal may include various gate pulses such as a scan pulse, a sensing pulse, an initialization pulse, a light emitting control pulse (hereinafter, referred to as an "EM pulse") and the like.

The timing controller 130 receives digital video data DATA of an input image from the host system, and a timing signal synchronized with the digital video data DATA. The timing signal may include a vertical synchronization signal Vsync, a horizontal synchronization signal Hsync, a clock CLK, and a data enable signal DE. Since the vertical period and the horizontal period can be known by means of counting the data enable signal DE, the vertical synchronization signal Vsync and the horizontal synchronization signal Hsync may be omitted. The data enable signal DE has a period of one horizontal period (1H).

The host system may be any one of a TV (television) system, a tablet computer, a notebook computer, a navigation system, a personal computer (PC), a home theater system, a mobile device, a wearable device, and a vehicle system. The host system may scale the image signal from the video source to fit the resolution of the display panel 100, and may transmit it to the timing controller 130 together with the timing signal.

The timing controller 130 may multiply the input frame frequency by i (i is a natural number) in the normal driving mode, so that it can control the operation timing of the display panel driver at a frame frequency of the input frame frequency×i Hz. The input frame frequency is 60 Hz in the NTSC (National Television Standards Committee) scheme, while it is 50 Hz in the PAL (phase-alternating line) scheme.

The timing controller 130 lowers (e.g., reduces) a frequency of a frame rate at which pixel data is written to pixels in the low speed driving mode compared to the normal driving mode. For example, the display panel driver may write pixel data to the pixels at a frame frequency of 60 Hz or higher, for example, any one of 60 Hz, 120 Hz, and 144 Hz, in the normal driving mode under the control of the timing controller 130, and may write pixel data to the pixels at a low frame frequency of about 1 Hz to 30 Hz in the low-speed driving mode.

The timing controller 130 generates a data timing control signal for controlling the operation timing of the data driver 110 based on the timing signals Vsync, Hsync, DE received from the host system, a control signal for controlling the operation timing of the de-multiplexer array 112, and a gate timing control signal for controlling the operation timing of the gate driver 120. The timing controller 130 controls the operation timing of the display panel driver to synchronize the data driver 110, the de-multiplexer array 112, the touch sensor driver, and the gate driver 120.

The gate timing control signal generated from the timing controller 130 may be inputted to the shift register of the gate driver 120 through a level shifter (not shown). The level shifter may receive the gate timing control signal, generate a start pulse and a shift clock, and provide them to the shift register of the gate driver 120.

Figure 3:
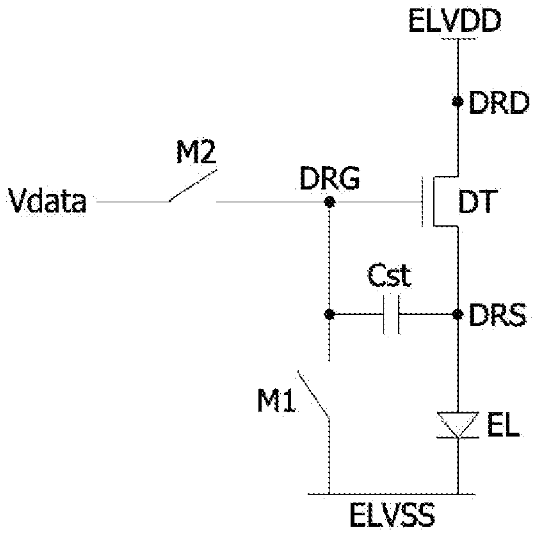
FIG. 3 is a circuit diagram showing a pixel circuit according to a first embodiment of this disclosure.

FIG. 3 is a circuit diagram showing a pixel circuit according to a first embodiment of this disclosure.

Referring to FIG. 3, the pixel circuit of this disclosure includes a light emitting element EL, a driving element DT for driving the light emitting element EL, a plurality of switch elements M1 and M2, and a capacitor Cst. The driving element DT and the switch elements M1 and M2 may be implemented as an n-channel oxide TFT.

The driving element DT generates a current according to the gate-source voltage Vgs to drive the light emitting element EL. The driving element DT includes a first electrode connected to the first node DRD, a gate electrode connected to the second node DRG, and a second electrode connected to the third node DRS. The pixel driving voltage ELVDD may be applied to the first node DRD. The capacitor Cst is connected between the second node DRG and the third node DRS to store the gate-source voltage Vgs of the driving element DT.

Meanwhile, a switch element that is turned on/off in response to a gate signal may be added between the VDD node to which the pixel driving voltage ELVDD is applied and the first node DRD. The VDD node is connected to the VDD line.

The light emitting element EL may be implemented as an OLED. The OLED includes an organic compound layer formed between an anode electrode and a cathode electrode. The organic compound layer includes, without limitation, a hole injection layer HIL, a hole transport layer HTL, an emission layer EML, an electron transport layer ETL, and an electron injection layer EIL. The anode electrode of the light emitting element EL is connected to the third node DRS, and the cathode electrode is connected to the VSS node to which the low-potential power supply voltage ELVSS is applied. The VSS node is connected to the VSS line. When a voltage is applied to the anode and cathode electrodes of the light emitting element, holes passing through the hole transport layer HTL and electrons passing through the electron transport layer ETL move to the emission layer EML to form excitons. In this case, visible light may be emitted from the emission layer EML. The OLED used as the light emitting element EL may have a tandem structure in which a plurality of emission layers are stacked. The tandem structure of OLED can improve the luminance and lifespan of pixels.

The light emitting element EL and the first switch element M1 are commonly connected to the VSS line. The first switch element M1 is connected between the second node DRG and the VSS node. When the first switch element M1 is turned on, the second node DRG may be connected to the VSS node and be discharged. Before the driving element DT and the light emitting element EL are driven, the first switch element M1 may discharge the second node DRG, which turns off the light emitting element EL and suppresses light emission, reducing residual charge of the display panel 100.

A reference voltage may be applied to the third node DRS, so that the voltage at the third node DRS may change rapidly. In this case, the voltage fluctuation at the third node DRS may be transferred to the VSS node through the capacitors formed at both ends of the light emitting element EL, so that a ripple of the low-potential power supply voltage ELVSS may be generated. The first switch element M1 may reduce the ripple of the low-potential power supply voltage ELVSS by lowering the voltage at the second node DRG before the voltage at the third node DRS changes abruptly to reduce the voltage fluctuation range at the third node DRS during the sudden change thereof. The first switch element M1 may be turned on according to the pulse of the gate signal, for example, the gate-on voltage VEH of the EM pulse EM, and be turned off according to the gate-off voltage VEL of the EM pulse EM, as shown in FIG. 4.

The second switch element M2 may be connected between the data line to which the data voltage Vdata is applied and the second node DRG to supply the data voltage Vdata to the second node DRG. The second switch element M2 may be turned on according to the pulse of the gate signal, for example, the gate-on voltage VGH of the scan pulse SCAN, and be turned off according to the gate-off voltage VGL of the scan pulse SCAN, as shown in FIG. 4.

Figure 4:
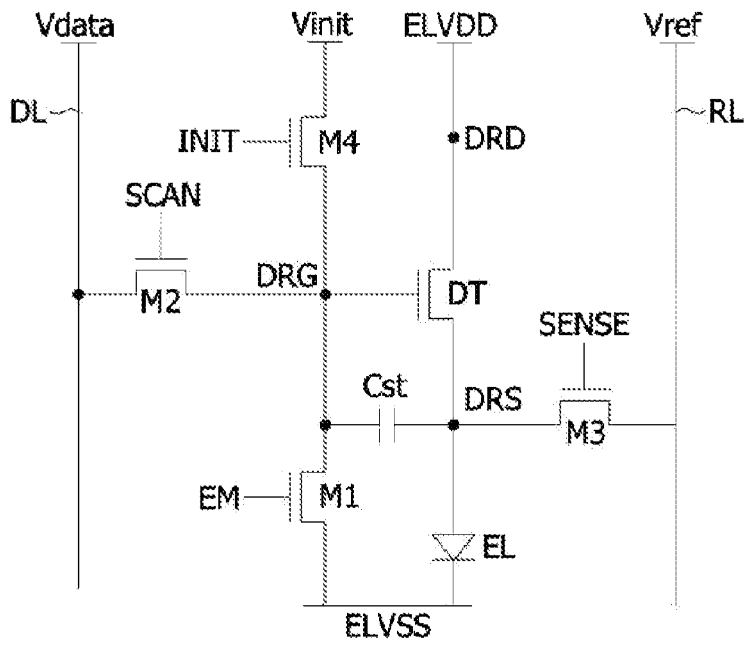
FIG. 4 is a circuit diagram showing a pixel circuit according to a second embodiment of this disclosure.
Figure 5:
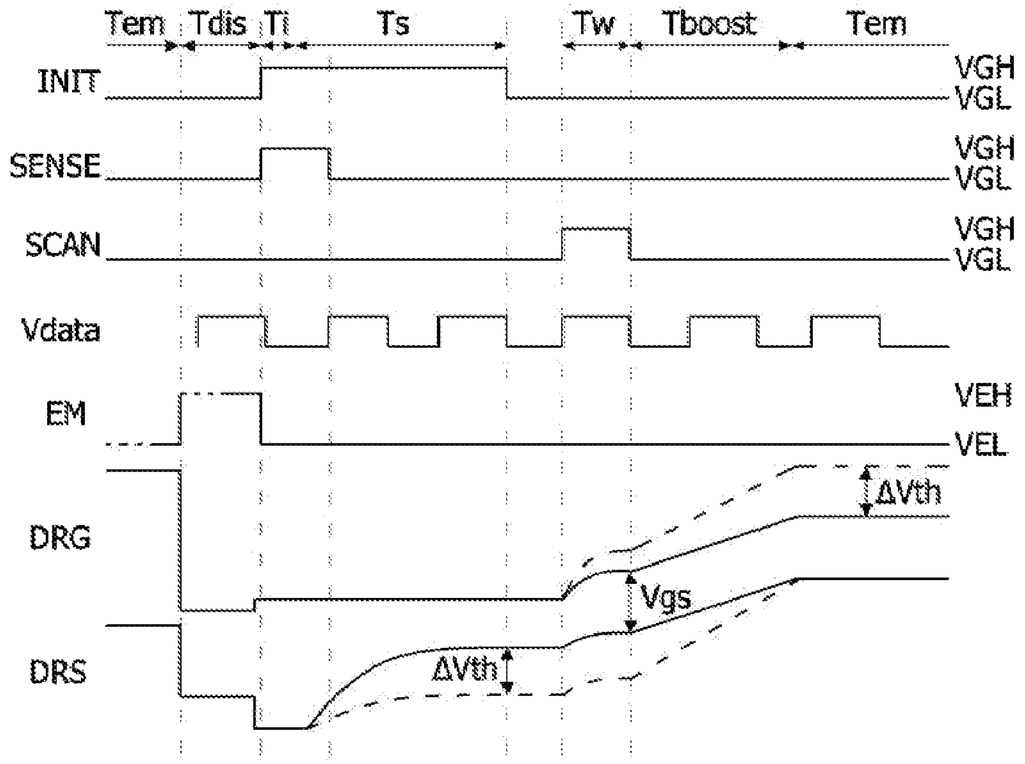
FIG. 5 is a waveform diagram showing a gate signal applied to the pixel circuit shown in FIG. 4 according to the second embodiment of this disclosure.

FIG. 4 is a circuit diagram showing a pixel circuit according to a second embodiment of this disclosure. FIG. 5 is a waveform diagram showing a gate signal applied to the pixel circuit shown in FIG. 4 according to the second embodiment of this disclosure.

Referring to FIGS. 4 and 5, the pixel circuit includes a light emitting element EL, a driving element DT for driving the light emitting element EL, a plurality of switch elements M1 to M4, and a capacitor Cst. The driving element DT and the switch elements M1 to M4 may be implemented as an n-channel oxide TFT.

This pixel circuit is connected to the VDD line to which the pixel driving voltage ELVDD is applied, the VSS line to which the low-potential power supply voltage ELVSS is applied, the INIT line to which the initialization voltage Vinit is applied, the REF line RL to which the reference voltage Vref is applied, and the data line DL to which the data voltage Vdata is applied, and gate lines to which gate signals INIT, SENSE, SCAN, EM are applied.

The gate driver 120 may include a first shift register which outputs and shifts an EM pulse (or a first gate pulse) EM, a second shift register which outputs and shifts a scan pulse (or a second gate pulse) SCAN, a third shift register which outputs and shifts a sensing pulse (or a third gate pulse) SENSE, and a fourth shift register which outputs and shifts an initialization pulse (or a fourth gate pulse) INIT.

As shown in FIG. 5, the driving period of the pixel circuit may be divided into a first initialization step Tdis, a second initialization step Ti, a sensing step Ts, a data writing step Tw, a boosting step Tboost, and a light emitting step Tem.

In the first initialization step Tdis, the second node DRG is discharged, and thus voltages at the second and third nodes DRG and DRS are lowered. In the second initialization step Ti, the pixel circuit is initialized. In the sensing step Ts, the threshold voltage Vth at the driving element DT is sensed and stored in the capacitor Cst. In the data writing step Tw, the data voltage Vdata at the pixel data is applied to the second node DRG. After the voltages at the second and third nodes DRG and DRS increase in the boosting step Tboost, the light emitting element EL may emit light with a luminance corresponding to the gray scale value of the pixel data in the light emitting step Tem.

The constant voltages ELVDD, ELVSS, Vinit, and Vref applied to the pixel circuit may be set to different voltage levels. The pixel driving voltage ELVDD is set to a voltage higher than the other constant voltages ELVSS, Vinit, and Vref. The initialization voltage Vinit is set as a gate voltage which is higher than the low-potential power supply voltage ELVSS, and which allows the driving element DT to be turned on. The reference voltage Vref may be set to a voltage less than the initialization voltage Vinit, and greater than or less than the low-potential power supply voltage ELVSS. The gate-on voltages VGH and VEH of the gate signals INIT, SENSE, SCAN, and EM may be set to a voltage greater than the pixel driving voltage ELVDD. The gate-off voltages VGL and VEL of the gate signals INIT, SENSE, SCAN, and EM may be set to a voltage less than the low-potential power supply voltage ELVSS. The gate-on voltage VEH of the EM pulse EM is set to a voltage different from the gate-on voltage VGH of the other gate signals INIT, SENSE, and SCAN, and the gate-off voltage VEL of the EM pulse EM may be set to a voltage different from the gate-off voltage VGL of the other gate signals INIT, SENSE, and SCAN.

In the first initialization step Tdis, the EM pulse EM is generated as the gate-on voltage VEH. At this time, the other gate signals INIT, SENSE, and SCAN are gate-off voltages VGL. In the first initialization step Tdis, the first switch element M1 is turned on, while the other switch elements M2, M3, and M4 are turned off. In the first initialization step Tdis, the second node DRG is discharged through the first switch element M1, so that the voltages at the second and third nodes DRG and DRS are reduced as shown in FIG. 5. When the voltage at the second node DRG decreases, the voltage at the third node DRS can be reduced together because the third node DRS is coupled to the second node DRG through the capacitor Cst and is floating in the first initialization step Tdis. Therefore, when the reference voltage Vref is applied to the third node DRS in the second initialization step Ti following the first initialization step Tdis, the voltage at the third node DRS does not change abruptly and its fluctuation range is small, thus reducing or minimizing the ripple magnitude of the low-potential power supply voltage ELVSS.

In the second initialization step Ti, the voltages of the initialization pulse INIT and the sensing pulse SENSE are inverted to the gate-on voltage VGH, and the EM pulse EM is inverted to the gate-off voltage VEL. The scan pulse SCAN maintains the gate-off voltage VGL in the second initialization step Ti. Accordingly, in the second initialization step Ti, the third and fourth switch elements M3 and M4 are turned on, and the first and second switch elements M1 and M2 are turned off. In the second initialization step Ti, the driving element DT is turned on.

In the sensing step Ts, the initialization pulse INIT is the gate-on voltage VGH, and the sensing pulse SENSE is inverted to the gate-off voltage VGL. In the sensing step Ts, the EM pulse EM and the scan pulse SCAN are gate-off voltages VGL and VEL. Accordingly, in the sensing step Ts, the fourth switch element M4 is turned on, while the first to third switch elements M1, M2, and M3 are turned off. In the sensing step Ts, when the voltage at the third node DRS rises and the gate-source voltage at the driving element DT becomes less than the threshold voltage Vth, the driving element DT is turned off and the threshold voltage (Vth) is stored in the capacitor (Cst).

In FIG. 5, "ΔVth" is the threshold voltage variation of the driving element DT. The voltage at the third node DRS may be changed in the sensing step Ts according to the threshold voltage variation ΔVth of the driving element DT.

In the data writing step Tw, the scan pulse SCAN synchronized with the data voltage Vdata of the pixel data is generated as the gate-on voltage VGH. The voltages of the initialization pulse INIT, the EM pulse EM, and the sensing pulse SENSE are gate-off voltages VGL and VEL in the data writing step Tw. Accordingly, in the data writing step Tw, the second switch element M2 is turned on, while the other switch elements M1, M3, and M4 are turned off. In the data writing step Tw, the voltage of the second node DRG connected to the gate electrode of the driving element DT is changed to the data voltage Vdata compensated by the threshold voltage Vth sampled in the capacitor Cst.

In the boosting step Tboost, the gate signals INIT, SENSE, SCAN, and EM are gate-off voltages VGL and VEL. Accordingly, all the switch elements M1, M2, M3, and M4 are turned off in the boosting step Tboost. At this time, the voltages at the floating second and third nodes DRG and DRS increase, and the capacitor connected between both ends of the light emitting element EL is charged.

In the light emitting step Tem, the gate signals INIT, SENSE, SCAN, and EM are gate-off voltages VGL and VEL. Accordingly, all the switch elements M1, M2, M3, and M4 maintain an off state in the light emitting step Tem. In the light emitting step Tem, when the voltage at the third node DRS is increased by a current generated according to the gate-source voltage Vgs of the driving element DT, so that the voltage at the third node DRS is equal to or higher than the threshold voltage of the light emitting element EL, the light emitting element EL may be turned on to emit light.

The light emitting element EL may be implemented as an OLED. In the OLED, the anode electrode is connected to the third node DRS, and the cathode electrode thereof is connected to the VSS line to which the low-potential power supply voltage ELVSS is applied.

The driving element DT generates a current according to the gate-source voltage Vgs to drive the light emitting element EL. The driving element DT includes a first electrode connected to the first node DRD, a gate electrode connected to the second node DRG, and a second electrode connected to the third node DRS. The capacitor Cst is connected between the second node DRG and the third node DRS.

The first switch element M1 is turned on according to the gate-on voltage VEH of the EM pulse EM in the first initialization step Tdis, and connects the second node DRG to the VSS node to which the low-potential power supply voltage ELVSS is applied. The first switch element M1 includes a first electrode connected to the second node DRG, a gate electrode connected to a first gate line to which the EM pulse EM is applied, and a second electrode connected to the VSS node.

The second switch element M2 is turned on according to the gate-on voltage VGH of the scan pulse SCAN synchronized with the data voltage Vdata in the data writing step Tw, and connects the data line DL to the second node DRG. The data voltage Vdata is applied to the second node DRG in the data writing step Tw. The second switch element M2 includes a first electrode connected to the data line DL to which the data voltage Vdata is applied, a gate electrode connected to the second gate line to which the scan pulse SCAN is applied, and a second electrode connected to the second node DRG.

The third switch element M3 is turned on according to the gate-on voltage VGH of the sensing pulse SENSE in the second initialization step Ti, and connects the third node DRS to the REF node to which the reference voltage Vref is applied, so that the reference voltage Vref is supplied to the third node DRS. The third switch element M3 includes a first electrode connected to the third node DRS, a gate electrode connected to a third gate line to which the sensing pulse SENSE is applied, and a second electrode connected to the REF node. The REF node is connected to the REF line.

The fourth switch element M4 is turned on according to the gate-on voltage VGH of the initialization pulse INIT in the second initialization step Ti and the sensing step Ts, and applies the initialization voltage Vinit to the second node DRG. The fourth switch element M4 includes a first electrode connected to an INIT node to which the initialization voltage Vinit is applied, a gate electrode connected to a fourth gate line to which an initialization pulse INIT is applied, and a second electrode connected to the second node DRG. The INIT node is connected to the INIT line.

According to the pixel circuit of this disclosure, the current charge of the second node DRS is minimized by discharging the second node DRG in the first initialization step Tdis. Since the voltages at the second and third nodes DRG and DRS are reduced in the first initialization step Tdis, the voltage fluctuation range at the third node DRS may be reduced, so that the ripple magnitude of the low-potential power supply voltage ELVSS may be reduced or minimized when the reference voltage Vref is applied to the third node DRS in the second initialization step Ti.

Figure 6:
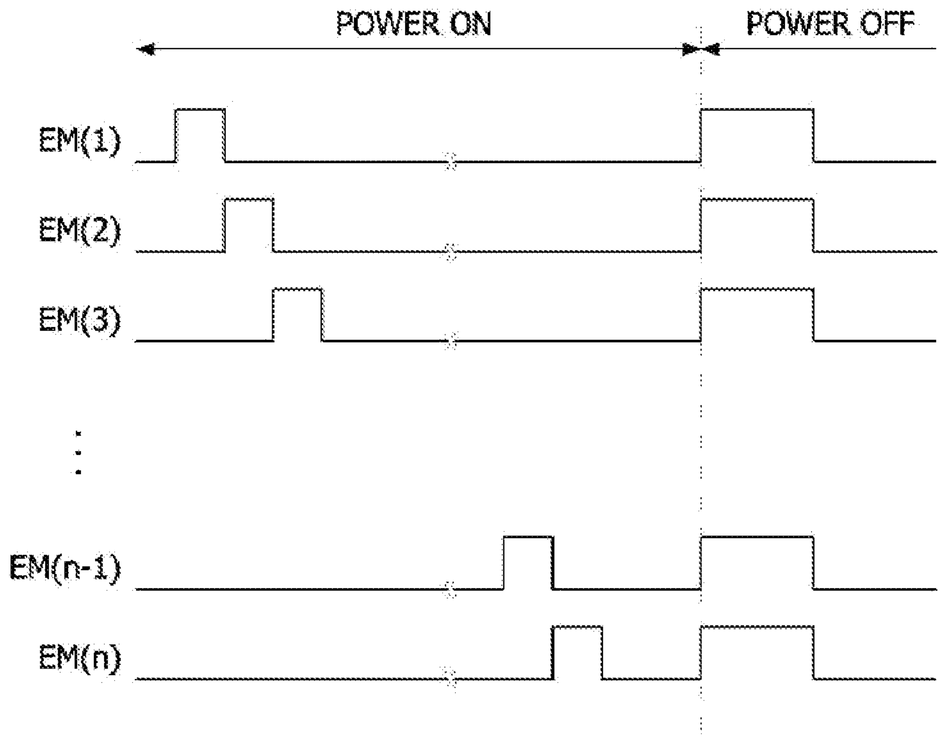
FIGS. 6 and 7 are waveform diagrams showing EM pulses before and after a power-off sequence of a display device according to an embodiment of this disclosure.
Figure 7:
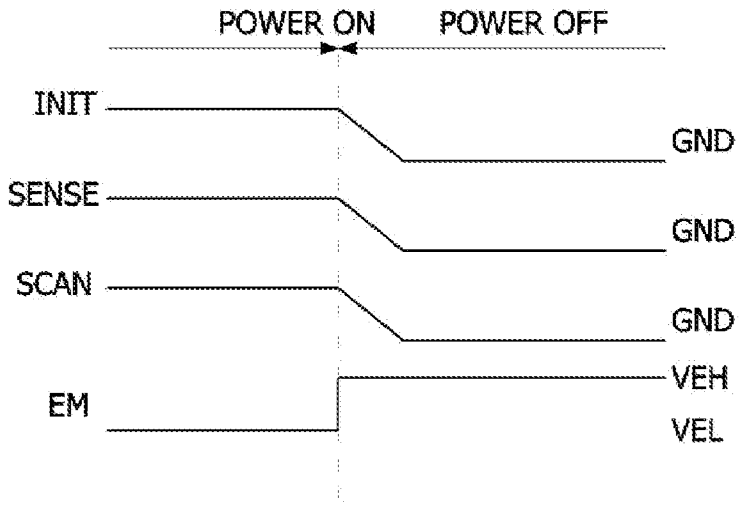
Figure 8:
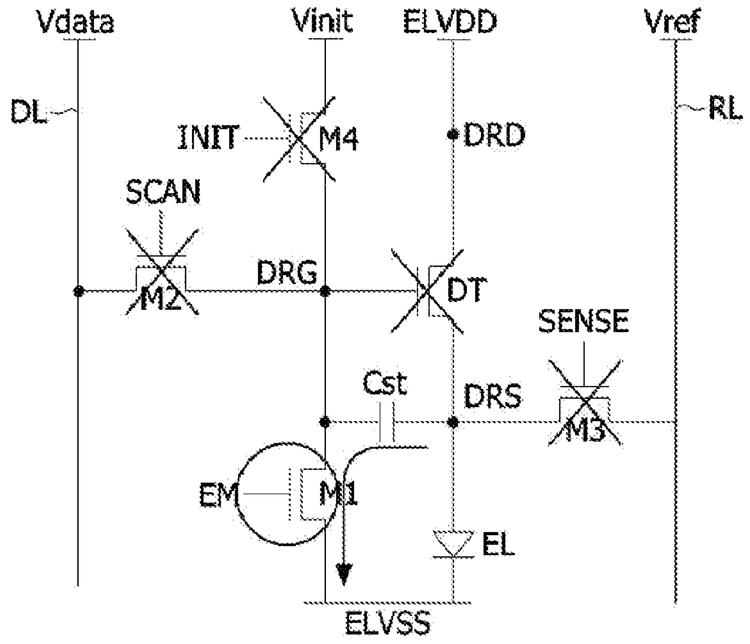
FIG. 8 is a circuit diagram showing discharge of a second node through a first switch element in a power-off sequence of a display device according to an embodiment of this disclosure.

The EM pulse EM may be simultaneously applied to all pixel lines in a power off sequence in which the power of the display device is turned off as shown in FIGS. 6 to 8, so that current charges may be removed from the pixels.

FIGS. 6 and 7 are waveform diagrams showing EM pulses before and after a power-off sequence of a display device according to an embodiment. FIG. 8 is a circuit diagram showing discharge of a second node through a first switch element in a power-off sequence of a display device according to an embodiment.

Referring to FIGS. 6 to 8, the EM pulses [EM(1) to EM(n)] are applied sequentially to all pixel lines L1 to Ln for every refresh frame in a power-on state (POWER ON) in which power is applied to the display device. In FIG. 6, a first EM pulse [EM(1)] is an EM pulse applied to the first pixel line L1, and the nth (n is a positive integer greater than or equal to 2) EM pulse [EM(n)] is an EM pulse applied to the nth pixel line Ln.

When other gate signals (SCAN, SENSE, INIT) are discharged to the ground voltage GND in the POWER OFF sequence in which the power of the display device is turned off, the EM pulses [EM(1) to EM(n)] are generated as the gate-on voltage VEH to simultaneously turn on the first switch element M1 in every pixel and thus discharge the second node DRG.

In the power-off sequence of the display device, the gate driver 120 is temporarily driven until the input driving voltage is discharged to the ground voltage GND, so that the EM pulses [EM(1) to EM(n)] can be simultaneously supplied to all the pixel lines L1 to Ln. Accordingly, in all pixels on the display panel 100, the second node DRG is discharged in the power-off sequence, so that current charges of the pixels may be reduced. In this case, the residual charge of the second node DRG may be discharged to the VSS node through the first switch element M1. When the first switch element M1 is turned on in the power-off sequence of the display device, other switch elements M2 to M4 and the driving element DT are turned off.

Figure 9:
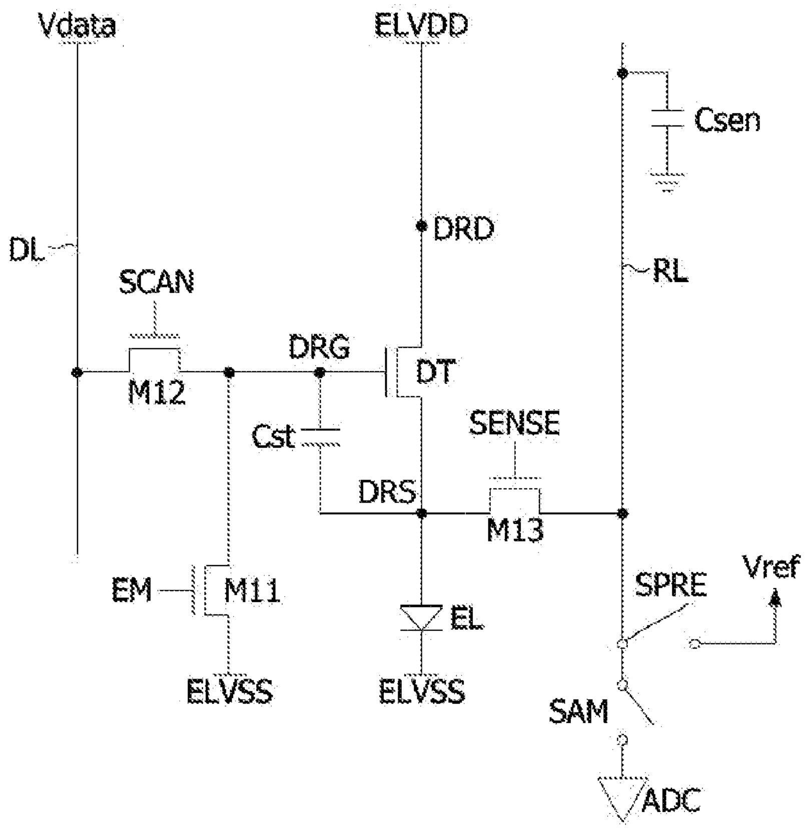
FIG. 9 is a circuit diagram showing a pixel circuit according to a third embodiment of this disclosure.
Figure 10:
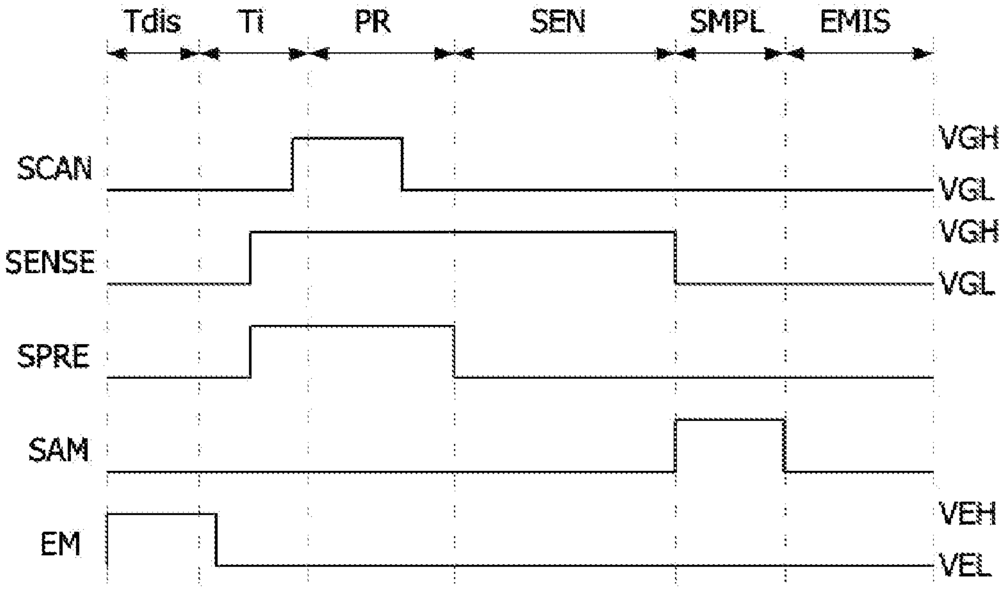
FIG. 10 is a waveform diagram showing a gate signal applied to the pixel circuit shown in FIG. 9 according to the third embodiment of this disclosure.

FIG. 9 is a circuit diagram showing a pixel circuit according to a third embodiment of this disclosure. FIG. 10 is a waveform diagram showing a gate signal applied to the pixel circuit shown in FIG. 9 according to the third embodiment of this disclosure. This embodiment shows an example of a pixel circuit connected to an external compensation circuit. The external compensation circuit may include a REF line RL connected to the pixel circuit, and an analog to digital converter (ADC) that converts the sensing voltage stored in the REF line RL into digital data. The sensing voltage may include electrical characteristics of the driving element DT, for example, a threshold voltage and/or mobility. An integrator may be connected to the input terminal of the ADC. The timing controller 130 to which the external compensation circuit is applied may generate a compensation value for compensating for changes in the electrical characteristics of the driving element DT according to the sensed data inputted from the ADC, and may compensate for the change in the electrical characteristics of the driving element DT by adding or multiplying the compensation value to the pixel data of the input image. The ADC may be embedded in the data driver 110.

Referring to FIGS. 9 and 10, the pixel circuit includes a light emitting element EL, a driving element DT for supplying electric current to the light emitting element EL, a plurality of switch elements M11 to M13, and a capacitor Cst. In this pixel circuit, the driving element DT and the switch elements M11 to M13 may be implemented as n-channel oxide TFTs.

The driving period of the pixel circuit may be divided into a first initialization step Tdis, a second initialization step Ti, a programming step PR, a sensing step SEN, a sampling step SMPL, and a light emitting step EMIS.

The scan pulse SCAN is synchronized with the data voltage Vdata of the pixel data, and is generated as the gate-on voltage VGH in the programming step PR. The scan pulse SCAN may rise to the gate-on voltage VGH at a timing close to the end time of the second initialization step Ti. The scan pulse SCAN is a gate-off voltage VGL in the sensing step SEN, the sampling step SMPL, and the light emitting step EMIS. The sensing pulse SENSE rises to the gate-on voltage VGH in the second initialization step Ti, and maintains the gate-on voltage VGH during the programming step PR and the sensing step SEN. The sensing pulse SENSE is the gate-off voltage VGL in the sampling step SMPL and the light emitting step EMIS.

The EM pulse EM is generated as the gate-on voltage VEH in the first initialization step Tdis, and is the gate-off voltage VEL in the second initialization step Ti, the programming step PR, the sensing step SEN, the sampling step SMPL, and the light emitting step EMIS.

The reference voltage switch element SPRE and the sampling switch element SAM may be connected to the REF line RL to which the reference voltage Vref is applied. The reference voltage switch element SPRE and the sampling switch element SAM are turned on under the control of the timing controller 130. The reference voltage switch element SPRE is turned on in the second initialization step Ti and the programming step PR to supply the reference voltage Vref to the REF line RL. The sampling switch element SAM is turned on in the sampling step SMPL to connect the REF line RL to the ADC.

The light emitting element EL may be implemented as an OLED including an anode electrode, a cathode electrode, and an organic compound layer connected between these electrodes. The anode electrode of the light emitting element EL is connected to the third node DRS, and the cathode electrode thereof is connected to the VS S node to which the low-potential power supply voltage ELVSS is applied.

The driving element DT generates an electric current for driving the light emitting element EL according to the gate-source voltage Vgs. The driving element DT includes a gate electrode connected to the second node DRG, a first electrode connected to the first node DRD to which the pixel driving voltage ELVDD is applied, and a second electrode connected to the third node DRS. The capacitor Cst is connected between the second node DRG and the third node DRS.

The first switch element M11 is connected between the second node DRG and the VSS node. When the first switch element M11 is turned on, the second node DRG may be connected to the VSS node and be discharged. The first switch element M11 may discharge the second node DRG before the driving element DT and the light emitting element EL are driven. The first switch element M11 includes a gate electrode connected to a first gate line to which the EM pulse EM is applied, a first electrode connected to the second node DRG, and a second electrode connected to the VSS node to which the low-potential power supply voltage ELVSS is applied.

The second switch element M12 is turned on according to the gate-on voltage VGH of the scan pulse SCAN to supply the data voltage Vdata to the second node DRG in the programming step PR. The second switch element M12 includes a gate electrode connected to the second gate line to which the scan pulse SCAN is applied, a first electrode connected to the data line DL to which the data voltage Vdata is applied, and a second electrode connected to the second node DRG.

The third switch element M13 is turned on according to the gate-on voltage VGH of the sensing pulse SENSE to connect the third node DRS to the REF line RL to which the reference voltage Vref is applied during the programming step PR and the sensing step SEN. In the sensing step SEN, the voltage at the third node DRS is stored in the capacitor Csen of the REF line RL, so that the electrical characteristics of the driving element DT are stored in the REF line RL, and the voltage on the REF line RL is converted to digital data through the ADC in the sampling step SMPL. The third switch element M13 includes a gate electrode connected to the third gate line to which the sensing pulse SENSE is applied, a first electrode connected to the third node DRS, and a second electrode connected to the REF line RL.

As described above, the first switch element M11 is turned on in the power-off sequence of the display device to discharge the second node DRG on all the pixel lines L1 to Ln of the display panel 100, so that residual charges of the pixels can be removed.

Figure 11:
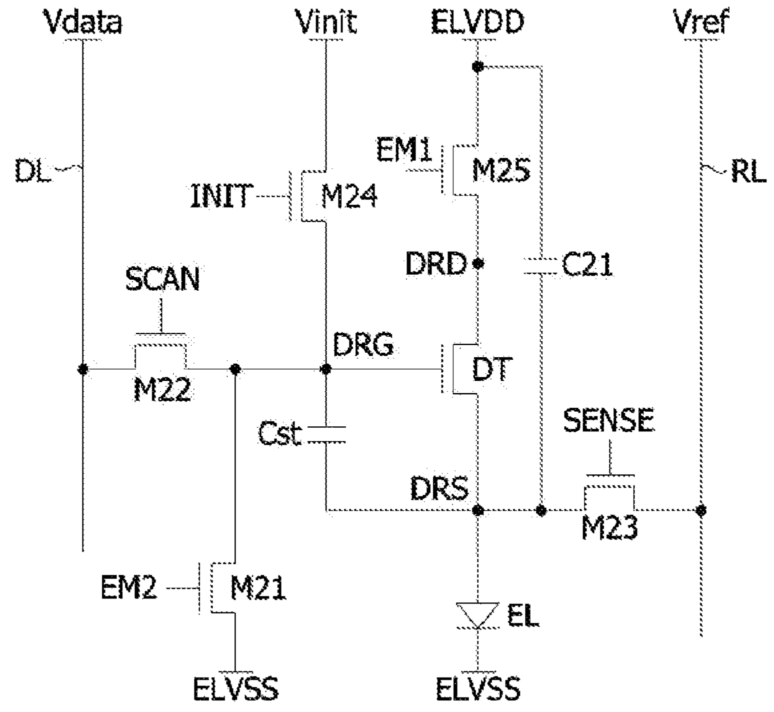
FIG. 11 is a circuit diagram showing a pixel circuit according to a fourth embodiment of this disclosure.
Figure 12:
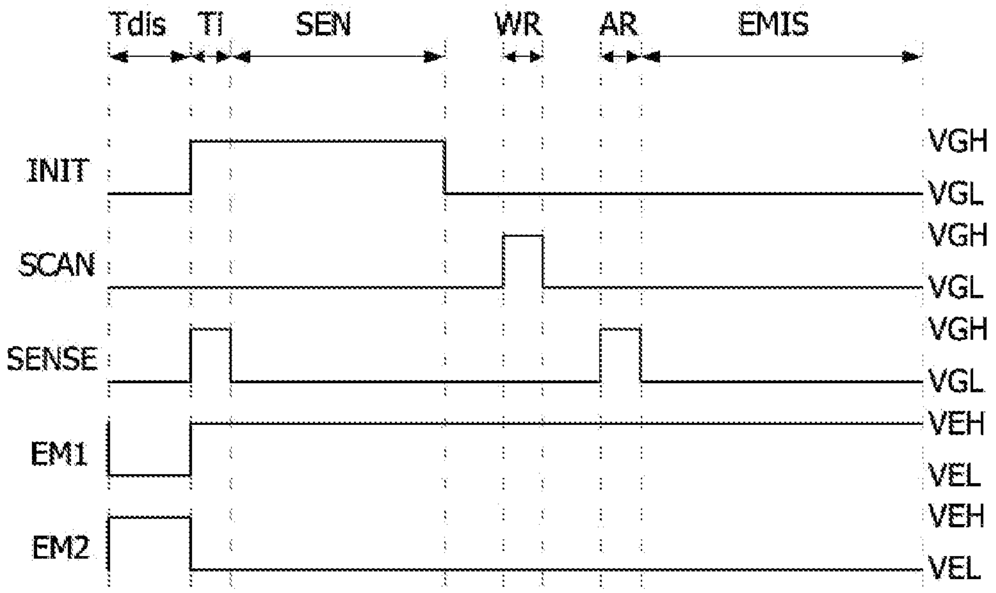
FIG. 12 is a waveform diagram showing a gate signal applied to the pixel circuit shown in FIG. 11 according to the fourth embodiment of this disclosure.

FIGS. 11 to 16 are diagrams showing a pixel circuit including an internal compensation circuit, and a driving signal thereof according to one embodiment. FIG. 11 is a circuit diagram showing a pixel circuit according to a fourth embodiment of this disclosure. FIG. 12 is a waveform diagram showing a gate signal applied to the pixel circuit shown in FIG. 11 according to the fourth embodiment of this disclosure.

Referring to FIGS. 11 and 12, the pixel circuit includes a light emitting element EL, a driving element DT for supplying electric current to the light emitting element EL, a plurality of switch elements M21 to M25, a first capacitor Cst, and a second capacitor C21. In this pixel circuit, the driving element DT and the switch elements M21 to M25 may be implemented as n-channel oxide TFTs.

A constant voltage, such as a pixel driving voltage ELVDD, a low-potential power supply voltage ELVSS, a reference voltage Vref, an initialization voltage Vinit, or the like, is applied to this pixel circuit. The pixel driving voltage ELVDD is a voltage greater than the low-potential power supply voltage ELVSS. The gate-on voltages VGH and VEH may be set to a voltage higher than the pixel driving voltage ELVDD. The gate-off voltages VGL and VEL may be set to a voltage less than the low-potential power supply voltage ELVSS. The reference voltage Vref may be set to a low-potential voltage close to the low-potential power supply voltage ELVSS. The initialization voltage Vinit may be set to a voltage at which the driving element DT may be turned on.

The driving period of this pixel circuit may be divided into a first initialization step Tdis, a second initialization step Ti, a sensing step SEN, an addressing step WR, an anode reset step AR, and a light emitting step EMIS. Between the anode reset step AR and the light emitting step EMIS, there may be a boosting step in which the voltages of the second and third nodes DRG and DRS rise. In the second initialization step Ti, the driving element DT is turned on. In the sensing step SEN, when the voltage of the third node DRS rises and the gate-source voltage Vgs of the driving element DT becomes less than the threshold voltage Vth, the driving element DT is turned off. When the driving element DT is turned off in the sensing step SEN, the threshold voltage Vth of the driving element DT is sampled to the capacitor Cst. When the data voltage Vdata is applied to the second node DRG in the addressing step WR, the data voltage Vdata compensated by the threshold voltage Vth is applied as the gate voltage of the driving element DT. In the anode reset step AR, the sensing pulse SENSE may be generated as the gate-on voltage VGH to supply the reference voltage Vref to the third node DRS.

The initialization pulse INIT is generated as the gate-on voltage VGH in the second initialization step Ti and the sensing step SEN. The initialization pulse INIT is the gate-off voltage VGL in the first initialization step Tdis, the addressing step WR, the anode reset step AR, and the light emitting step EMIS. The scan pulse SCAN is synchronized with the data voltage Vdata of the pixel data, and is generated as the gate-on voltage VGH in the addressing step WR. The scan pulse SCAN is the gate-off voltage VGL in the first initialization step Tdis, the second initialization step Ti, the sensing step SEN, the anode reset step AR, and the light emitting step EMIS. The sensing pulse SENSE is generated as the gate-on voltage VGH in the second initialization step Ti and the anode reset step AR. The sensing pulse SENSE is the gate-off voltage VGL in the first initialization step Tdis, the sensing step SEN, the addressing step WR, and the light emitting step EMIS.

The first EM pulse EM1 is generated as a gate-on voltage VEH in the second initialization step Ti, the sensing step SEN, the addressing step WR, the anode reset step AR, and the light emitting step EMIS. The first EM pulse EM1 is the gate-off voltage VEL in the first initialization step Tdis.

The second EM pulse EM2 may be generated as an antiphase pulse of the first EM pulse EM1. The second EM pulse EM2 is generated as the gate-on voltage VEH in the first initialization step Tdis. The second EM pulse EM2 is a gate-off voltage VEL in the second initialization step Ti, the sensing step SEN, the addressing step WR, the anode reset step AR, and the light emitting step EMIS.

The light emitting element EL may be implemented as an OLED including an anode electrode, a cathode electrode, and an organic compound layer connected between these electrodes. The anode electrode of the light emitting element EL is connected to the third node DRS, and the cathode electrode thereof is connected to the VSS node.

The driving element DT generates an electric current for driving the light emitting element EL according to the gate-source voltage Vgs. The driving element DT includes a gate electrode connected to the second node DRG, a first electrode connected to the first node DRD, and a second electrode connected to the third node DRS. The first capacitor Cst is connected between the second node DRG and the third node DRS. The second capacitor C21 is connected between the VDD node to which the pixel driving voltage ELVDD is applied and the third node DRS.

The first switch element M21 is turned on according to the gate-on voltage VEH of the second EM pulse EM2 in the first initialization step Tdis to discharge the second node DRG. The first switch element M21 includes a gate electrode connected to a first gate line to which the second EM pulse EM2 is applied, a first electrode connected to the second node DRG, and a second electrode connected to the VSS node.

The second switch element M22 is turned on according to the gate-on voltage VGH of the scan pulse SCAN to supply the data voltage Vdata to the second node DRG in the addressing step WR. The second switch element M22 includes a gate electrode connected to the second gate line to which the scan pulse SCAN is applied, a first electrode connected to the data line DL to which the data voltage Vdata is applied, and a second electrode connected to the second node DRG.

The third switch element M23 is turned on according to the gate-on voltage VGH of the sensing pulse SENSE to connect the third node DRS to the REF line RL to which the reference voltage Vref is applied in the second initialization step Ti and the anode reset step AR. The third switch element M23 includes a gate electrode connected to the third gate line to which the sensing pulse SENSE is applied, a first electrode connected to the third node DRS, and a second electrode connected to the REF line RL.

The fourth switch element M24 is turned on according to the gate-on voltage VGH of the initialization pulse INIT to supply the initialization voltage Vinit to the second node DRG in the second initialization step Ti and the sensing step SEN. The fourth switch element M24 includes a gate electrode connected to the fourth gate line to which the initialization pulse INIT is applied, a first electrode connected to the INIT line to which the initialization voltage Vinit is applied, and a second electrode connected to the second node DRG.

The fifth switch element M25 is turned on according to the gate-on voltage VEH of the first EM pulse EM1 to supply the pixel driving voltage ELVDD to the first node DRD in the second initialization step Ti, the sensing step SEN, the addressing step WR, the anode reset step AR and the light emitting step EMIS. The fifth switch element M25 includes a gate electrode connected to a fifth gate line to which the first EM pulse EM1 is applied, a first electrode connected to the VDD line, and a second electrode connected to the first node DRD.

Figure 13:
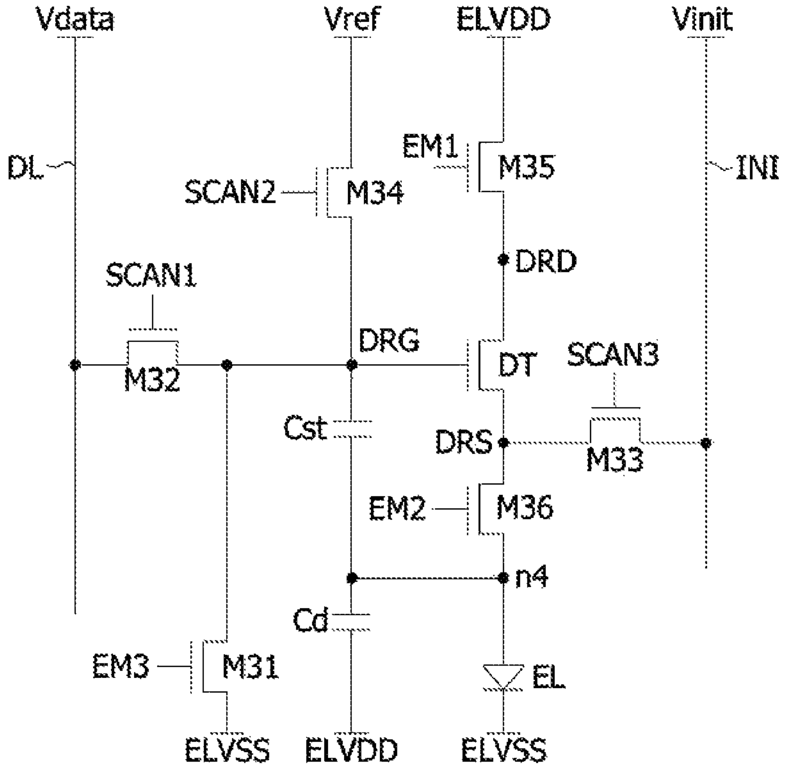
FIG. 13 is a circuit diagram showing a pixel circuit according to a fifth embodiment of this disclosure.
Figure 14:
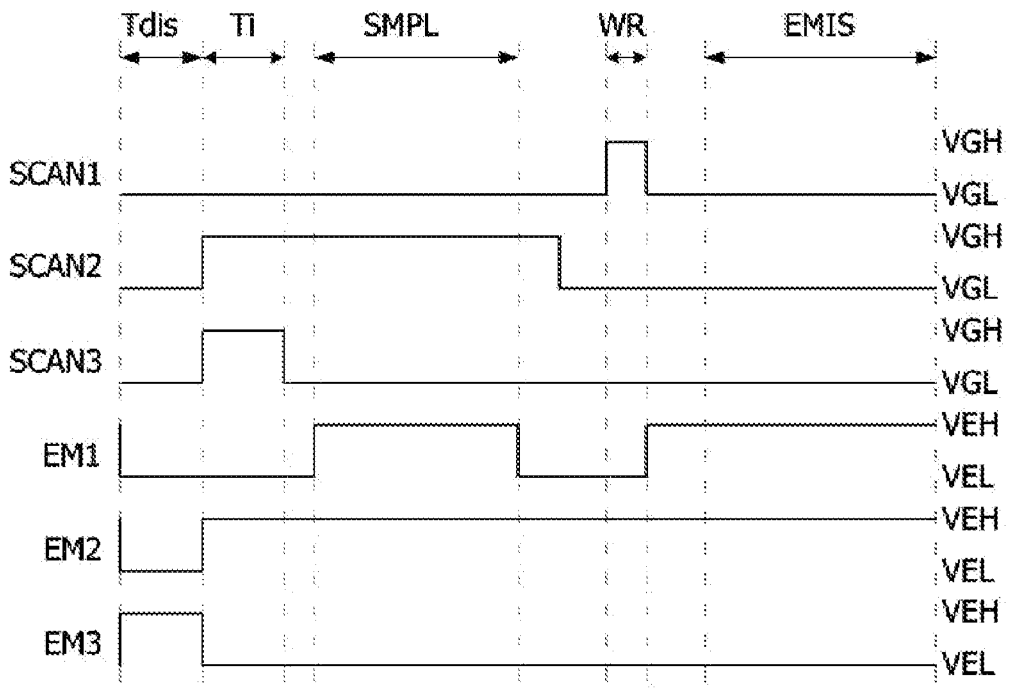
FIG. 14 is a waveform diagram showing a gate signal applied to the pixel circuit shown in FIG. 13 according to the fifth embodiment of this disclosure.

FIG. 13 is a circuit diagram showing a pixel circuit according to a fifth embodiment of this disclosure. FIG. 14 is a waveform diagram showing a gate signal applied to the pixel circuit shown in FIG. 13 according to the fifth embodiment of this disclosure. In this embodiment, the gate signal includes a first scan pulse SCAN1, a second scan pulse SCAN2, a third scan pulse SCANS, a first EM pulse EM1, a second EM pulse EM2, and a third EM pulse EM3.

Referring to FIGS. 13 and 14, the pixel circuit includes a light emitting element EL, a driving element DT for supplying electric current to the light emitting element EL, a plurality of switch elements M31 to M36, a first capacitor Cst, and a second capacitor Cd.

In this pixel circuit, the driving element DT and the switch elements M31 to M36 may be implemented as n-channel oxide TFTs.

A constant voltage, such as a pixel driving voltage ELVDD, a low-potential power supply voltage ELVSS, a reference voltage Vref, an initialization voltage Vinit, or the like, is applied to this pixel circuit. The pixel driving voltage ELVDD is a voltage greater than the low-potential power supply voltage ELVSS. The gate-on voltage VGH may be set to a voltage greater than the pixel driving voltage ELVDD. The gate-off voltage VGL may be set to a voltage less than the low-potential power supply voltage ELVSS. The initialization voltage Vinit may be set to a low-potential voltage close to the low-potential power supply voltage ELVSS. The reference voltage Vref may be set to a voltage at which the driving element DT may be turned on.

The driving period of this pixel circuit may be divided into a first initialization step Tdis, a second initialization step Ti, a sampling step SMPL, an addressing step WR, and a light emitting step EMIS. Between the addressing step WR and the light emitting step EMIS, there may be a boosting step in which the voltages of the second and third nodes DRG and DRS rise.

The first scan pulse SCAN1 is synchronized with the data voltage Vdata of the pixel data, and is generated as the gate-on voltage VGH in the addressing step WR. The first scan pulse SCAN1 is a gate-off voltage VGL in the first initialization step Tdis, the second initialization step Ti, the sampling step SMPL, and the light emitting step EMIS. The second scan pulse SCAN2 is generated as the gate-on voltage VGH in the second initialization step Ti and the sampling step SMPL. The second scan pulse SCAN2 is the gate-off voltage VGL in the first initialization step Tdis, the addressing step WR, and the light emitting step EMIS. The third scan pulse SCAN3 is generated as the gate-on voltage VGH in the second initialization step Ti. The third scan pulse SCAN3 is the gate-off voltage VGL in the first initialization step Tdis, the sampling step SMPL, the addressing step WR, and the light emitting step EMIS.

The first EM pulse EM1 is the gate-off voltage VEL in the first initialization step Tdis, the second initialization step Ti, and the addressing step WR. The first EM pulse EM1 is generated as the gate-on voltage VEH in the sampling step SMPL and the light emitting step EMIS.

The second EM pulse EM2 is the gate-off voltage VEL in the first initialization step Tdis. The second EM pulse EM2 is generated as the gate-on voltage VEH in the second initialization step Ti, the sampling step SMPL, the addressing step WR, and the light emitting step EMIS.

The third EM pulse EM3 is generated in antiphase of the second EM pulse EM2. The third EM pulse EM3 is generated as the gate-on voltage VEH in the first initialization step Tdis, and is the gate-off voltage VEL in the second initialization step Ti, the sampling step SMPL, the addressing step WR, and the light emitting step EMIS.

The light emitting element EL may be implemented as an OLED including an anode electrode, a cathode electrode, and an organic compound layer connected between these electrodes. The anode electrode of the light emitting element EL is connected to the fourth node n4, and the cathode electrode thereof is connected to the VSS node.

The driving element DT generates an electric current for driving the light emitting element EL according to the gate-source voltage Vgs. The driving element DT includes a gate electrode connected to the second node DRG, a first electrode connected to the first node DRD, and a second electrode connected to the third node DRS.

The first capacitor Cst is connected between the second node DRG and the fourth node n4. The second capacitor Cd is connected between the fourth node n4 and the VDD node to function as stabilizing the voltage of the fourth node n4, but may be omitted.

The first switch element M31 is turned on according to the gate-on voltage VEH of the third EM pulse EM3 to discharge the second node DRG in the first initialization step Tdis. The first switch element M31 is turned off according to the gate-off voltage VEL of the third EM pulse EM3. The first switch element M31 includes a gate electrode connected to a first gate line to which the third EM pulse EM3 is applied, a first electrode connected to the second node DRG, and a second electrode connected to the VSS node.

The second switch element M32 is turned on according to the gate-on voltage VGH of the first scan pulse SCAN1 to supply the data voltage Vdata to the second node DRG in the addressing step WR. The second switch element M32 includes a gate electrode connected to the second gate line to which the first scan pulse SCAN1 is applied, a first electrode connected to the data line DL to which the data voltage Vdata is applied, and a second electrode connected to the second node DRG.

The third switch element M33 is turned on according to the gate-on voltage VGH of the third scan pulse SCAN3 to connect the third node DRS to the INIT line to which the initialization voltage Vinit is applied in the second initialization step Ti. The third switch element M33 includes a gate electrode connected to the third gate line to which the third scan pulse SCAN3 is applied, a first electrode connected to the third node DRS, and a second electrode connected to the INIT line.

The fourth switch element M34 is turned on according to the gate-on voltage VGH of the second scan pulse SCAN2 to supply the reference voltage Vref to the second node DRG in the second initialization step Ti and the sampling step SMPL. The fourth switch element M34 includes a gate electrode connected to the fourth gate line to which the second scan pulse SCAN2 is applied, a first electrode to which the reference voltage Vref is applied, and a second electrode connected to the second node DRG.

The fifth switch element M35 is turned on according to the gate-on voltage VEH of the first EM pulse EM1 to supply the pixel driving voltage ELVDD to the first node DRD in the sampling step SMPL and the light emitting step EMIS. The fifth switch element M35 includes a gate electrode connected to a fifth gate line to which the first EM pulse EM1 is applied, a first electrode connected to the VDD line, and a second electrode connected to the first node DRD.

The sixth switch element M36 is turned on according to the gate-on voltage VEH of the second EM pulse EM2 to connect the third node DRS to the fourth node n4 during the second initialization step Ti, the sampling step SMPL, the addressing step WR, and the light emitting step EMIS. The sixth switch element M36 includes a gate electrode connected to a sixth gate line to which the second EM pulse EM2 is applied, a first electrode connected to the third node DRS, and a second electrode connected to the fourth node n4.

Figure 15:
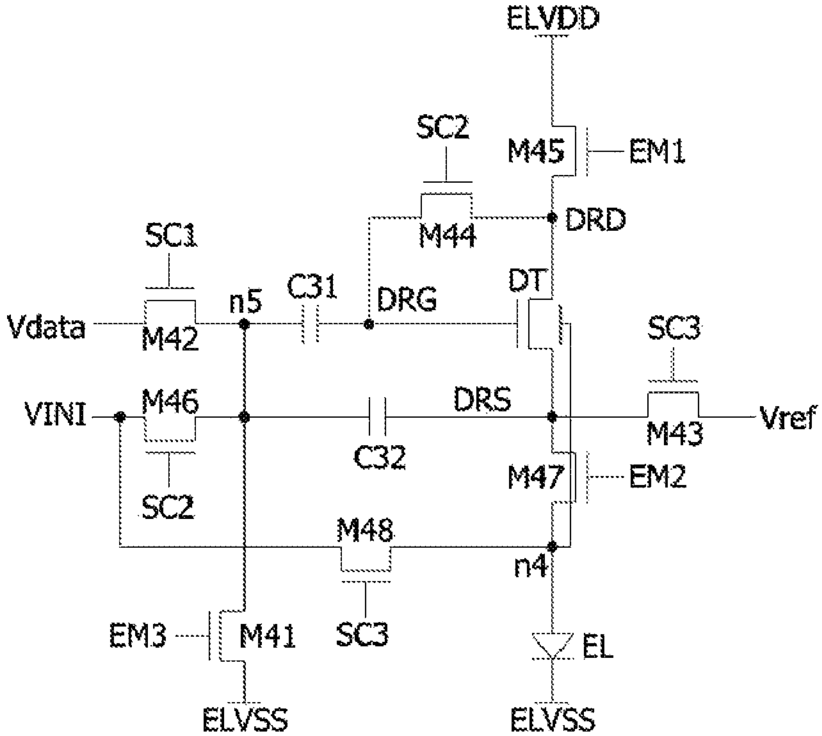
FIG. 15 is a circuit diagram showing a pixel circuit according to a sixth embodiment of this disclosure.
Figure 16:
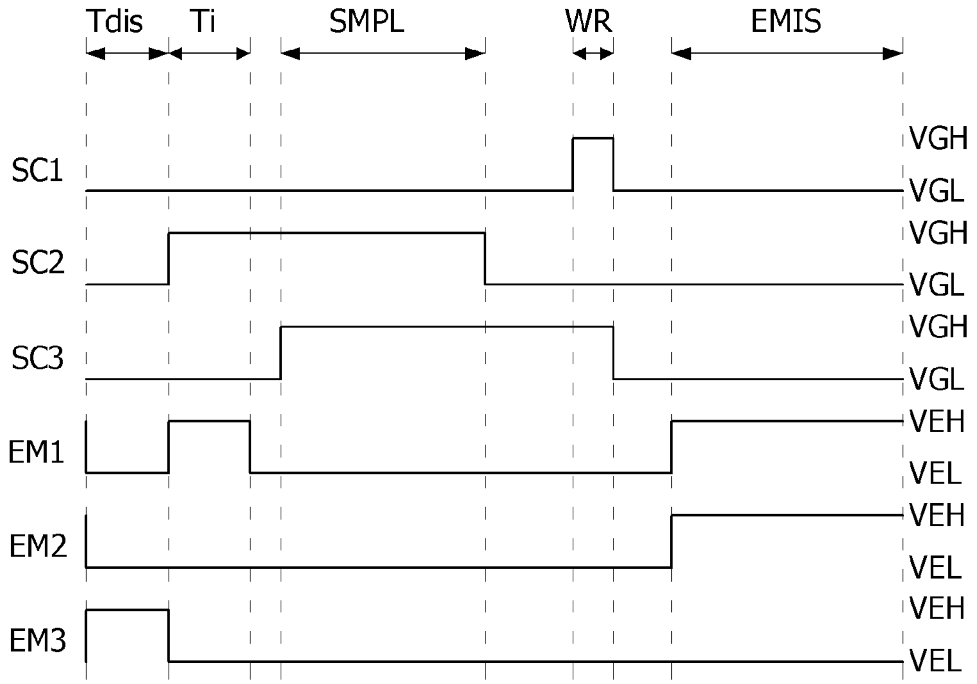
FIG. 16 is a waveform diagram showing a gate signal applied to the pixel circuit shown in FIG. 15 according to the sixth embodiment of this disclosure.

FIG. 15 is a circuit diagram showing a pixel circuit according to a sixth embodiment of this disclosure. FIG. 16 is a waveform diagram showing a gate signal applied to the pixel circuit shown in FIG. 15 according to the sixth embodiment of this disclosure. The gate signal includes a first scan pulse SC1, a second scan pulse SC2, a third scan pulse SC3, a first EM pulse EM1, a second EM pulse EM2, and a third EM pulse EM3.

In the sixth embodiment of this disclosure, it is possible to shift the threshold voltage of the driving element into a sensible voltage range by applying a preset voltage to the second gate electrode of the driving element DT in the internal compensation circuit of the diode connection method. As a result, according to this disclosure, the threshold voltage Vth of the driving element DT shifted to a voltage of 0 V or less can be shifted to a sensible voltage.

Referring to FIGS. 15 and 16, the pixel circuit includes a light emitting element EL, a driving element DT, a plurality of switch elements M41 to M48, a first capacitor C31, and a second capacitor C32. The driving element DT and the switch elements M41 to M48 may be implemented as an n-channel oxide TFT.

To this pixel circuit, a data voltage (Vdata) of pixel data, scan pulses (SC1, SC2, SC3), and EM pulses (EM1, EM2, EM3) as well as a constant voltage such as a pixel driving voltage ELVDD, a low-potential power supply voltage ELVSS, a reference voltage Vref, an initialization voltage Vinit, or the like are supplied. Voltages of the scan pulses SC1, SC2, and SC3 and the EM pulses EM1, EM2, and EM3 swing between the gate-on voltages VGH and VEH and the gate-off voltages VGL and VEL.

The constant voltage commonly applied to the pixels may be set to ELVDD>Vref>Vinit>ELVSS, but is not limited thereto. The reference voltage Vref may be set to a voltage greater than the initialization voltage Vinit so that a negative back-bias is applied to the driving element DT in the sampling step SMPL. The gate-on voltage VGH may be set to a voltage greater than the pixel driving voltage ELVDD. The gate-off voltage VGL may be set to a voltage less than the low-potential power supply voltage ELVSS.

The driving period of the pixel circuit may be divided into a first initialization step Tdis in which the second node DRG is discharged in a non-light emitting state, a second initialization step Ti in which the pixel circuit is initialized, a sampling step SMPL in which the threshold voltage Vth of the driving element DT is sampled, an addressing step WR in which the data voltage Vdata is charged and pixel data is written, and a light emitting step EMIS in which the light emitting element EL emits light.

The first scan pulse SC1 may be generated as a gate-on voltage VGH synchronized with the data voltage Vdata in the addressing step WR. The first scan pulse SC1 may be a gate-off voltage VGL in the first initialization step Tdis, the second initialization step Ti, the sampling step SMPL, and the light emitting step EMIS.

The second scan pulse SC2 may rise to the gate-on voltage VGH prior to the third scan pulse SC3, and may fall to the gate-off voltage VGL prior to a falling edge of the third scan pulse SC3. The second scan pulse SC2 may be generated as the gate-on voltage VGH in the second initialization step Ti and the sampling step SMPL. The second scan pulse SC2 may be the gate-off voltage VGL in the first initialization step Tdis, the addressing step WR, and the light emitting step EMIS.

The third scan pulse SC3 may be generated as a gate-on voltage VGH in the sampling step SMPL and the addressing step WR. In the addressing step WR, the gate-on voltage section of the third scan pulse SC3 may overlap the gate-on voltage section of the first scan pulse SC1. After rising to the gate-on voltage VGH after the rising edge of the second scan pulse SC2, the third scan pulse SC3 may fall to the gate-off voltage VGL after the falling edge of the second scan pulse SC2. The third scan pulse SC3 may be the gate-off voltage VGL in the first initialization step Tdis, the second initialization step Ti, and the light emitting step EMIS.

The first EM pulse EM1 may be generated as the gate-on voltage VGH in the second initialization step Ti and the light emitting step EMIS. The first EM pulse EM1 may be the gate-off voltage VGL in the sampling step SMPL and the addressing step WR.

The second EM pulse EM2 may be generated as the gate-off voltage VEL in the first initialization step Tdis, the second initialization step Ti, the sampling step SMPL, and the addressing step WR, while it may be the gate-on voltage VEH in the light emitting step EMIS.

The third EM pulse EM3 is generated as the gate-on voltage VEH in the first initialization step Tdis. The third EM pulse EM3 may be the gate-off voltage VEL in the second initialization step Ti, the sampling step SMPL, the addressing step WR, and the light emitting step EMIS.

The anode electrode of the light emitting element EL is connected to the fourth node n4, and the cathode electrode thereof is connected to the VSS node.

The first capacitor C31 may be connected between the second node DRG and the fifth node n5. The first capacitor C31 stores the threshold voltage Vth of the driving element DT in the sampling step SMPL. In the addressing step WR, the data voltage Vdata is transferred to the first gate electrode of the driving element DT through the first capacitor C31.

The second capacitor C32 is connected between the third node DRS and the fifth node n5. The second capacitor C32 stores the second electrode voltage, i.e., the source voltage, of the driving element DT at the beginning of the light emitting step EMIS, and maintains the gate-source voltage Vgs of the driving element DT in the light emitting step EMIS.

The driving element DT may be a MOSFET of a double gate structure. The driving element DT includes a first gate electrode connected to the second node DRG, a second gate electrode connected to the fourth node n4, a first electrode connected to the first node DRD, and a second electrode connected to the third node DRS. The first gate electrode and the second gate electrode of the driving element DT may overlap each other with a semiconductor pattern forming a semiconductor channel therebetween.

The first switch element M41 is turned on according to the gate-on voltage VEH of the third EM pulse EM3, and is turned off according to the gate-off voltage VEL of the third EM pulse EM3. The first switch element M41 is turned on according to the gate-on voltage VEH of the third EM pulse EM3 in the first initialization step Tdis to connect the second node DRG to the VSS node and discharge the second node DRG. The first switch element M41 includes a first electrode connected to the second node DRG, a gate electrode to which the third EM pulse EM3 is applied, and a second electrode connected to the VSS node.

The second switch element M42 includes a first electrode connected to the data line DL to which the data voltage Vdata is applied, a second electrode connected to the fifth node n5, and a gate electrode to which the first scan pulse SC1 is applied. The second switch element M42 is turned on in the addressing step WR in response to the gate-on voltage VGH of the first scan pulse SC1 to supply the data voltage Vdata to the fifth node n5.

The third switch element M43 includes a first electrode connected to the third node DRS, a second electrode to which the reference voltage Vref is applied, and a gate electrode to which the third scan pulse SC3 is applied. The third switch element M43 is turned on in the sampling step SMPL and the addressing step WR in response to the gate-on voltage VGH of the third scan pulse SC3 to apply the reference voltage Vref to the third node DRS.

The fourth switch element M44 includes a first electrode connected to the first node DRD, a second electrode connected to the second node DRG, and a gate electrode to which the second scan pulse SC2 is applied. The fourth switch element M44 is turned on in the second initialization step Ti and the sampling step SMPL in response to the gate-on voltage VGH of the second scan pulse SC2 to connect the first node DRD with the second node DRG. When the fourth switch element M44 is turned on, the first gate electrode and the first electrode of the driving element DT are connected to each other so that the driving element DT operates as a diode.

The fifth switch element M45 includes a first electrode to which the pixel driving voltage ELVDD is applied, a second electrode connected to the first node DRD, and a gate electrode to which the first EM pulse EM1 is applied. The fifth switch element M45 is turned on in the second initialization step Ti and the light emitting step EMIS in response to the gate-on voltage VEH of the first EM pulse EM1 to supply the pixel driving voltage ELVDD to the first node DRD.

The sixth switch element M46 includes a first electrode to which the initialization voltage VINI is applied, a second electrode connected to the fifth node n5, and a gate electrode to which the second scan pulse SC2 is applied. The sixth switch element M46 is turned on in the second initialization step Ti and the sampling step SMPL in response to the gate-on voltage VGH of the second scan pulse SC2 to supply the initialization voltage VINI to the fifth node n5.

The seventh switch element M47 includes a first electrode connected to the third node DRS, a second electrode connected to the fourth node n4, and a gate electrode to which the second EM pulse EM2 is applied. The seventh switch element M47 is turned on in the light emitting step EMIS in response to the gate-on voltage VEH of the second EM pulse EM2 to form an electric current path between the driving element DT and the light emitting element EL.

The eighth switch element M48 includes a first electrode to which the initialization voltage VINI is applied, a second electrode connected to the fourth node n4, and a gate electrode to which the third scan pulse SC3 is applied. The eighth switch element M48 is turned on in the sampling step SMPL and the addressing step WR in response to the gate-on voltage VGH of the third scan pulse SC3 to supply the initialization voltage VINI to the fourth node n4. When the eighth switch element M48 is turned on, the reference voltage Vref is applied to the third node DRS through the third switch element M43.

In the sixth embodiment of this disclosure, the threshold voltage Vth of the driving element DT may be sampled by applying the reference voltage Vref to the third node DRS in the sampling step SMPL, and the sampling step SMPL and the addressing step WR may be separated by applying the data voltage Vdata to the fifth node n5 in the addressing step WR. As a result, the sixth embodiment can ensure that the time of the sampling step SMPL is sufficiently long, for example, as long as two or more horizontal periods.

Figure 17:
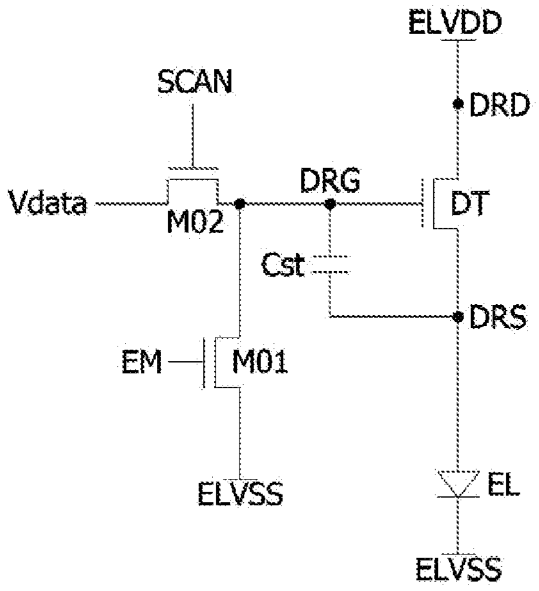
FIG. 17 is a circuit diagram showing a pixel circuit according to a seventh embodiment of this disclosure.
Figure 18:
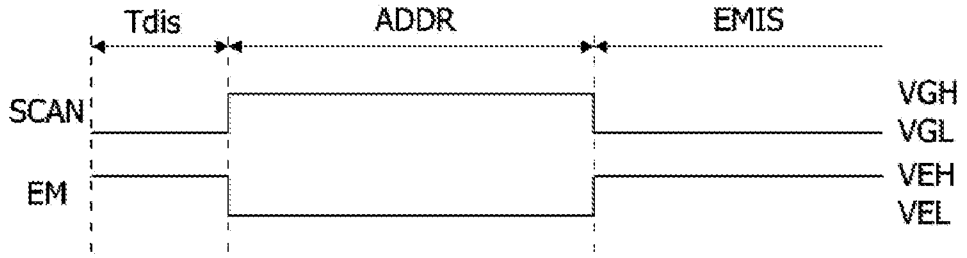
FIG. 18 is a waveform diagram showing a gate signal applied to the pixel circuit shown in FIG. 17 according to the seventh embodiment of this disclosure.

FIG. 17 is a circuit diagram showing a pixel circuit according to a seventh embodiment of this disclosure. FIG. 18 is a waveform diagram showing a gate signal applied to the pixel circuit shown in FIG. 17.

Referring to FIGS. 17 and 18, the pixel circuit includes a light emitting element EL, a driving element DT supplying electric current to the light emitting element EL, a first switch element M01 discharging a second node DRG in response to an EM pulse EM, a second switch element M02 supplying the data voltage Vdata to the gate electrode of the driving element DT in response to the scan pulse SCAN, and a capacitor Cst connected between the second node DRG and the third node DRS. In this pixel circuit, the driving element DT and the switch elements M01 and M02 may be implemented as n-channel oxide TFTs.

A constant voltage, such as a pixel driving voltage ELVDD, a low-potential power supply voltage ELVSS or the like, is applied to this pixel circuit. The pixel driving voltage ELVDD is a voltage higher than the low-potential power supply voltage ELVSS. The gate-on voltages VGH and VEH may be set to a voltage higher than the pixel driving voltage ELVDD. The gate-off voltages VGL and VEL may be set to a voltage lower than the low-potential power supply voltage ELVSS.

The light emitting element EL may be implemented as an OLED including an anode electrode, a cathode electrode, and an organic compound layer connected between these electrodes. The anode electrode of the light emitting element EL is connected to the third node DRS, and the cathode electrode thereof is connected to the VSS node.

The driving element DT includes a gate electrode connected to the second node DRG, a first electrode connected to the first node DRD to which the pixel driving voltage ELVDD is applied, and a second electrode connected to the third node DRS. The capacitor Cst is connected between the second node DRG and the third node DRS to store the gate-source voltage Vgs of the driving element DT.

The EM pulse EM is generated as the gate-off voltage VEL during the data addressing step ADDR, and is generated as the gate-on voltage VEH during the initialization step Tdis and the light emitting step EMIS. The first switch element M01 is turned on according to the gate-on voltage VEH of the EM pulse EM to connect the second node DRG to the VSS node and discharge the second node DRG. The first switch element M01 includes a gate electrode to which the EM pulse EM is applied, a first electrode connected to the second node DRG, and a second electrode connected to the VSS node.

The scan pulse SCAN is generated as a gate-on voltage VGH during the data addressing step ADDR. The second switch element M02 is turned on according to the gate-on voltage VGH of the scan pulse SCAN to supply the data voltage Vdata to the second node DRG. The second switch element M02 includes a gate electrode to which a scan pulse SCAN is applied, a first electrode to which a data voltage Vdata of pixel data is applied, and a second electrode connected to the second node DRG.

Figure 19:
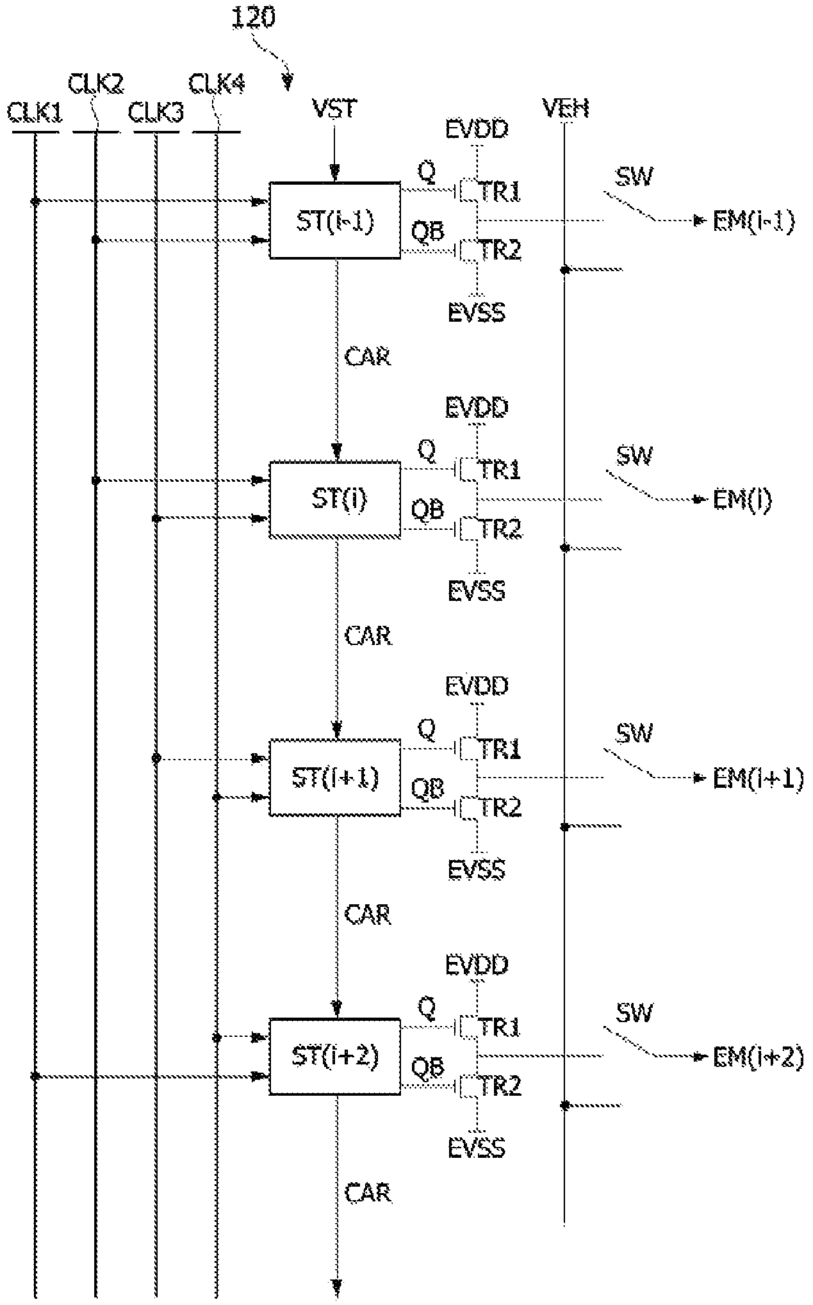
FIG. 19 is a diagram showing a switch element connected to an output terminal of a shift register of a gate driver according to one embodiment.

As shown in FIG. 19, the gate driver 120 may further include switch elements SW for simultaneously supplying the EM pulses EM to the pixel lines according to one embodiment.

Figure 20:
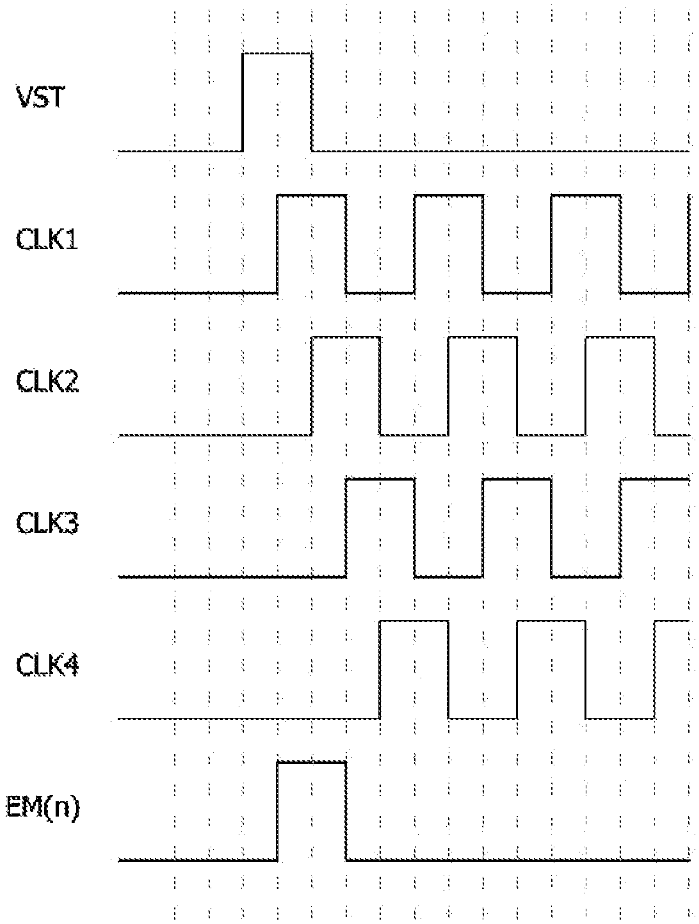
FIG. 20 is a waveform diagram showing input/output signals of the shift register shown in FIG. 19 according to one embodiment.

FIG. 19 is a diagram showing a switch element connected to an output node of a shift register in the gate driver 120 according to one embodiment. FIG. 20 is a waveform diagram showing input/output signals of the shift register shown in FIG. 19 according to one embodiment.

Referring to FIGS. 19 and 20, the gate driver 120 includes a shift register that sequentially outputs EM pulses [EM(i−1) to EM(i+2)] in synchronization with the shift clock CLK, and switch elements SW connected to the output node of the shift register. As shown in FIG. 19, the shift register receives the start signal VST and shift clocks CLK1 to 4 and outputs a gate signal, and is synchronized with the shift clock and shifts EM pulses [EM(i−1) to EM(i+2)].

The shift register includes signal transfer parts [ST(i−1) to ST(i+2)] which are dependently connected. Each of the signal transfer parts [ST(i−1) to ST(i+2)] includes a VST node to which the start signal VST is inputted, a CLK node to which the shift clocks CLK1 to 4 are inputted, and the like.

The start signal VST is generally inputted to the first signal transfer part. In FIG. 19, the i−1th (i is a positive integer less than n) signal transfer part [ST(i−1)] may be a first signal transfer part receiving the start signal VST. The shift clocks CLK1 to CLK4 may be a four-phase clock as shown in FIG. 19, but for example, the shift clocks may be k-phase (k is a natural number) clock.

The signal transfer parts [ST(i) to ST(i+2)] dependently connected to the i−1th signal transfer part [ST(i−1)] receive the carry signal CAR from the previous signal transfer part as the start signal and start to be driven. Each of the signal transfer parts [ST(i−1) to ST(i+2)] may output an EM pulse [EM(i−1) to EM(i+2)] through an output node, and may simultaneously outputs the carry signal CAR through another output node.

The buffer BUF includes the first transistor TR1 and the second transistor TR2 connected to the output node from which the EM pulses [EM(i−1) to EM(i+2)] are outputted, and outputs the EM pulses [EM(n−1) to EM(n+2)] through the output node. The output node is connected to the gate line through the switch element SW.

The first transistor TR1 is a pull-up transistor, and the second transistor TR2 is a pull-down transistor. The first transistor TR1 includes a gate electrode connected to the first control node Q, a first electrode connected to the EVDD node to which the gate driving voltage EVDD is applied, and a second electrode connected to the output node. The gate driving voltage EVDD may be set as the gate-on voltage VEH. The second transistor TR2 is connected to the first transistor TR1 with an output node therebetween. The second transistor TR2 includes a gate electrode connected to the second control node QB, a first electrode connected to the output node, and a second electrode connected to an EVSS node to which the gate reference voltage EVSS is applied.

Each of the switch elements SW may be implemented as a multiplexer including a first input node connected to an output node of the shift register, a second input node connected to a VEH node to which a gate-on voltage is applied, and an output node connected to a gate line. The switch element SW maintains a state in which the output node of the shift register is connected to the gate line in the power-on state of the display device under the control of the timing controller 130. The switch element SW connects the VEH node to all gate lines to which the EM pulses [EM(i−1) to EM(i+2)] are applied in the power-off sequence generated when the power-off switch of the display device is activated. At this time, the EM pulses [EM(i−1) to EM(i+2)] are simultaneously applied to all the pixels.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A pixel circuit comprising:

a driving element including a first electrode of the driving element that is connected to a first node to which a pixel driving voltage is applied, a gate electrode of the driving element that is connected to a second node, and a second electrode of the driving element that is connected to a third node, the driving element configured to supply an electric current to a light emitting element;

a first switch element configured to discharge the second node, the first switch element including a gate electrode, a first electrode connected to the gate electrode of the driving element at the second node, and a second electrode connected to a VSS node to which a low-potential power supply voltage is applied;

a light emitting element including an anode electrode connected to the second electrode of the driving element at the third node and a cathode electrode connected to the second electrode of the first switch element at the VSS node;

a storage capacitor including a first electrode connected to the first electrode of the first switch element and the gate electrode of the driving element at the second node and a second electrode connected to the anode electrode of the light emitting element and the second electrode of the driving element at the third node; and a second switch element configured to supply a data voltage to the second node.

2. The pixel circuit of claim 1, wherein the gate electrode of the first switch element is connected to a first gate line to which a first gate pulse is applied, and wherein the second switch element includes a first electrode of the second switch element that is connected to a data line to which the data voltage is applied, a gate electrode of the second switch element that is connected to a second gate line to which a second gate pulse is applied, and a second electrode of the second switch element that is connected to the second node.

3. The pixel circuit of claim 2, further comprising:

a third switch element that includes a first electrode of the third switch element that is connected to the third node, a gate electrode of the third switch element that is connected to a third gate line to which a third gate pulse is applied, and a second electrode of the third switch element that is connected to a REF node to which a reference voltage is applied, the third switch element turned on according to a gate-on voltage of the third gate pulse to connect the third node to the REF node; and a fourth switch element that includes a first electrode of the fourth switch element that is connected to an INIT node to which an initialization voltage is applied, a gate electrode of the fourth switch element that is connected to a fourth gate line to which a fourth gate pulse is applied, and a second electrode of the fourth switch element that is connected to the second node, the fourth switch element turned on according to a gate-on voltage of the fourth gate pulse to apply the initialization voltage to the second node, wherein the first switch element to the fourth switch element are turned on according to the gate-on voltage applied to the respective gate electrodes of the first switch element to the fourth switch element, and are turned off according to a gate-off voltage applied to the respective gate electrodes of the first switch element to the fourth switch element.

4. The pixel circuit of claim 3, wherein a driving period of the pixel circuit is divided into a first initialization step, a second initialization step after the first initialization step, a sensing step after the second initialization step, a data writing step after the sensing step, a boosting step after the data writing step, and a light emitting step after the boosting step, wherein in the first initialization step, the first gate pulse is generated as the gate-on voltage, and the second to fourth gate pulses are the gate-off voltage, wherein in the second initialization step, the third gate pulse and the fourth gate pulse are the gate-on voltage, and the first gate pulse and the second gate pulse are the gate-off voltage, wherein in the sensing step, the fourth gate pulse is the gate-on voltage, and the first gate pulse, the second gate pulse, and the third gate pulse are the gate-off voltage, wherein in the data writing step, the second gate pulse is generated as the gate-on voltage, and the first gate pulse, the third gate pulse, and the fourth gate pulse are the gate-off voltage, and wherein in the boosting step and the light emitting step, the first gate pulse to the fourth gate pulse are the gate-off voltage.

5. A display device comprising:

a display panel including a plurality of data lines, a plurality of gate lines crossing the plurality of data lines, a plurality of power lines, and a plurality of pixel circuits connected to the plurality of data lines, the plurality of gate lines, and the plurality of power lines;

a data driver configured to supply a data voltage of pixel data to the plurality of data lines; and a gate driver configured to supply a gate signal to the plurality of gate lines, wherein the plurality of power lines include:

a VDD line to which a pixel driving voltage is applied; and a VSS line to which a low-potential power supply voltage is applied, wherein each of the plurality of pixel circuits includes:

a driving element which includes a first electrode of the driving element that is connected to a first node to which the pixel driving voltage is applied, a gate electrode of the driving element that is connected to a second node, and a second electrode of the driving element that is connected to a third node, the driving element configured to supply an electric current to a light emitting element;

a first switch element configured to discharge the second node, the first switch element including a gate electrode, a first electrode connected to the gate electrode of the driving element at the second node, and a second electrode connected to a VSS node to which a low-potential power supply voltage is applied;

a light emitting element including an anode electrode connected to the second electrode of the driving element at the third node and a cathode electrode connected to the second electrode of the first switch element at the VSS node;

a storage capacitor including a first electrode connected to the first electrode of the first switch element and the gate electrode of the driving element at the second node and a second electrode connected to the anode electrode of the light emitting element and the second electrode of the driving element at the third node; and a second switch element configured to supply a data voltage to the second node.

6. The display device of claim 5, wherein the gate electrode of the first switch element is connected to a first gate line of the plurality of gate lines to which a first gate pulse is applied, and wherein the second switch element includes a first electrode of the second switch element that is connected to a data line to which the data voltage is applied, a gate electrode of the second switch element that is connected to a second gate line from the plurality of gate lines to which a second gate pulse is applied, and a second electrode of the second switch element that is connected to the second node.

7. The display device of claim 6, wherein the plurality of power lines further include:

a REF line to which a reference voltage is applied; and an INIT line to which an initialization voltage is applied, wherein each of the plurality of pixel circuits further includes:

a third switch element that includes a first electrode of the third switch element that is connected to the third node, a gate electrode of the third switch element that is connected to a third gate line from the plurality of gate lines to which a third gate pulse is applied, and a second electrode of the third switch element that is connected to the REF line, the third switch element turned on according to a gate-on voltage of the third gate pulse to connect the third node to the REF line; and a fourth switch element which includes a first electrode of the fourth switch element that is connected to the INIT line, a gate electrode of the fourth switch element that is connected to a fourth gate line from the plurality of gate lines to which a fourth gate pulse is applied, and a second electrode of the fourth switch element that is connected to the second node, the fourth switch element is turned on according to a gate-on voltage of the fourth gate pulse to apply the initialization voltage to the second node, and wherein the first switch element to the fourth switch element are turned on according to the gate-on voltage applied to the respective gate electrodes of the first switch element to the fourth switch element, and are turned off according to a gate-off voltage applied to the respective gate electrodes first switch element to the fourth switch element.

8. The display device of claim 6, wherein when the second gate pulse is discharged to a ground voltage in a power-off sequence of the display device, the first gate pulse is generated as a gate-on voltage at which the first switch element is turned on.

9. The display device of claim 6, wherein the first gate pulse is sequentially applied to all pixel lines of the display panel every refresh frame in a power-on state in which power is applied to the display device, and wherein the first gate pulse is generated as a gate-on voltage in a power-off sequence in which the power of the display device is turned off, such that the first switch elements in all the pixel lines are simultaneously turned on.

10. The display device of claim 6, wherein responsive to the first switch element being turned on in a power-off sequence of the display device, the second switch element and the driving element are turned off.

* * * * *